United States Patent
Kuo et al.

(10) Patent No.: US 8,508,150 B2
(45) Date of Patent: Aug. 13, 2013

(54) CONTROLLERS, SYSTEMS AND METHODS FOR CONTROLLING DIMMING OF LIGHT SOURCES

(75) Inventors: Ching-Chuan Kuo, Taipei (TW); Yung-Lin Lin, Palo Alto, CA (US)

(73) Assignee: O2Micro, Inc., Santa Clara, CA (US)

( * ) Notice: Subject to any disclaimer, the term of this patent is extended or adjusted under 35 U.S.C. 154(b) by 0 days.

(21) Appl. No.: 13/042,349

(22) Filed: Mar. 7, 2011

(65) Prior Publication Data

US 2011/0181199 A1 Jul. 28, 2011

Related U.S. Application Data

(63) Continuation-in-part of application No. 12/415,028, filed on Mar. 31, 2009, now Pat. No. 8,076,867, which is a continuation-in-part of application No. 12/316,480, filed on Dec. 12, 2008, now Pat. No. 8,044,608, application No. 13/042,349, which is a continuation-in-part of application No. 12/761,681, filed on Apr. 16, 2010, now Pat. No. 8,339,063.

(30) Foreign Application Priority Data

Mar. 4, 2010 (CN) .......................... 2010 1 0119888

(51) Int. Cl.
*H05B 37/02* (2006.01)
(52) U.S. Cl.
USPC .......................................... 315/291; 315/307
(58) Field of Classification Search
USPC ............. 315/185 R, 224, 225, 244, 245, 287, 315/291, 307, 312, 314
See application file for complete search history.

(56) References Cited

U.S. PATENT DOCUMENTS

| | | | |
|---|---|---|---|
| 5,691,605 A | 11/1997 | Xia et al. | |
| 5,959,443 A | 9/1999 | Littlefield | |
| 6,320,330 B1 | 11/2001 | Haavisto et al. | |
| 6,727,662 B2 | 4/2004 | Konopka et al. | |
| 6,839,247 B1 | 1/2005 | Yang et al. | |
| 6,946,819 B2 | 9/2005 | Fagnani et al. | |
| 6,975,078 B2 * | 12/2005 | Yanai et al. .................... | 315/291 |
| 6,984,963 B2 | 1/2006 | Pidutti et al. | |

(Continued)

FOREIGN PATENT DOCUMENTS

| | | |
|---|---|---|
| CN | 1498055 A | 5/2004 |
| CN | 1694597 A | 11/2005 |

(Continued)

OTHER PUBLICATIONS

The datasheet describes an Universal High Brightness LED driver HV9910B from Supertex Inc.

(Continued)

*Primary Examiner* — Jimmy Vu

(57) ABSTRACT

A controller for controlling dimming of an LED light source includes a control terminal and dimming control circuitry coupled to the control terminal. The control terminal provides a driving signal to control a control switch coupled to the LED light source, thereby controlling the dimming of the LED light source. The dimming control circuitry generates the driving signal according to a set of operations of a power switch that transfers an AC signal. The dimming control circuitry further adjusts the driving signal by counting multiple waves of the AC signal to control the dimming of the LED light source.

20 Claims, 23 Drawing Sheets

(56) References Cited

U.S. PATENT DOCUMENTS

| | | |
|---|---|---|
| 7,084,582 B2 | 8/2006 | Buonocunto |
| 7,141,940 B2 | 11/2006 | Ortiz |
| 7,148,664 B2 | 12/2006 | Takahashi et al. |
| 7,180,274 B2 | 2/2007 | Chen et al. |
| 7,190,124 B2 | 3/2007 | Kumar et al. |
| 7,259,527 B2 | 8/2007 | Foo |
| 7,288,902 B1 | 10/2007 | Melanson |
| 7,304,464 B2 | 12/2007 | Weng et al. |
| 7,307,614 B2 | 12/2007 | Vinn |
| 7,312,783 B2 | 12/2007 | Oyama |
| 7,323,828 B2 | 1/2008 | Russell et al. |
| 7,639,517 B2 | 12/2009 | Zhou et al. |
| 7,649,325 B2 | 1/2010 | McIntosh et al. |
| 7,710,084 B1 | 5/2010 | Guo |
| 7,759,881 B1 * | 7/2010 | Melanson ................ 315/307 |
| 7,800,315 B2 | 9/2010 | Shteynberg et al. |
| 7,804,256 B2 | 9/2010 | Melanson |
| 7,852,017 B1 | 12/2010 | Melanson |
| 7,863,828 B2 | 1/2011 | Melanson |
| 7,888,922 B2 | 2/2011 | Melanson |
| 7,944,153 B2 | 5/2011 | Greenfeld |
| 8,085,005 B2 | 12/2011 | Dearn |
| 8,232,780 B2 | 7/2012 | Uno |
| 8,274,800 B2 | 9/2012 | Uno et al. |
| 8,339,063 B2 | 12/2012 | Yan et al. |
| 8,344,657 B2 | 1/2013 | Zhan et al. |
| 2003/0048632 A1 | 3/2003 | Archer |
| 2004/0085030 A1 | 5/2004 | Laflamme et al. |
| 2004/0130271 A1 | 7/2004 | Sekoguchi et al. |
| 2005/0017691 A1 | 1/2005 | Aradachi et al. |
| 2006/0012997 A1 | 1/2006 | Catalano et al. |
| 2006/0139907 A1 | 6/2006 | Yen |
| 2007/0182347 A1 | 8/2007 | Shteynberg et al. |
| 2007/0262724 A1 | 11/2007 | Mednik |
| 2008/0180075 A1 | 7/2008 | Xie et al. |
| 2008/0203946 A1 | 8/2008 | Ito et al. |
| 2008/0258641 A1 | 10/2008 | Nakagawa et al. |
| 2008/0258647 A1 | 10/2008 | Scianna |
| 2009/0167187 A1 | 7/2009 | Kitagawa et al. |
| 2009/0184662 A1 | 7/2009 | Given et al. |
| 2009/0189548 A1 | 7/2009 | Hoffman et al. |
| 2009/0195180 A1 | 8/2009 | Chenetz |
| 2009/0224686 A1 | 9/2009 | Kunimatsu |
| 2009/0251059 A1 | 10/2009 | Veltman |
| 2009/0251071 A1 | 10/2009 | Gater et al. |
| 2009/0295303 A1 | 12/2009 | Pucko et al. |
| 2009/0322254 A1 | 12/2009 | Lin |
| 2009/0322255 A1 | 12/2009 | Lin |
| 2010/0013409 A1 | 1/2010 | Quek et al. |
| 2010/0308733 A1 | 12/2010 | Shao |
| 2011/0001766 A1 | 1/2011 | Hua et al. |
| 2011/0013437 A1 | 1/2011 | Uruno et al. |
| 2011/0037399 A1 | 2/2011 | Hung et al. |
| 2011/0050185 A1 | 3/2011 | Notman et al. |
| 2011/0140630 A1 | 6/2011 | Doudousakis et al. |
| 2011/0227506 A1 | 9/2011 | Ren et al. |
| 2012/0081018 A1 | 4/2012 | Shteynberg et al. |
| 2012/0146532 A1 | 6/2012 | Ivey et al. |

FOREIGN PATENT DOCUMENTS

| | | |
|---|---|---|
| CN | 1760721 A | 4/2006 |
| CN | 101176386 A | 5/2008 |
| CN | 101179879 A | 5/2008 |
| CN | 101193486 A | 6/2008 |
| CN | 101222800 A | 7/2008 |
| CN | 101242143 A | 8/2008 |
| CN | 101370335 A | 2/2009 |
| CN | 101466186 A | 6/2009 |
| CN | 101472368 A | 7/2009 |
| CN | 101489335 A | 7/2009 |
| CN | 101500354 A | 8/2009 |
| CN | 101511136 A | 8/2009 |
| CN | 101572974 A | 11/2009 |
| CN | 101605413 A | 12/2009 |
| CN | 101605416 A | 12/2009 |
| CN | 101742771 A | 6/2010 |
| CN | 101801129 A | 8/2010 |
| CN | 101815383 A | 8/2010 |
| CN | 201682668 U | 12/2010 |
| CN | 102014540 A | 4/2011 |
| CN | 102056378 A | 5/2011 |
| EP | 1565042 A2 | 8/2005 |
| EP | 2026634 A1 | 2/2009 |
| EP | 2273851 A2 | 1/2011 |
| JP | 10070846 A | 3/1998 |
| JP | 2001245436 A | 9/2001 |
| JP | 2010282757 A | 12/2010 |
| WO | 2008001246 A1 | 1/2008 |

OTHER PUBLICATIONS

The datasheet describes a PWM high efficiency LED driver controller A704 from ADDtek Corp., Aug. 2008.
English language translation of Abstract for CN101466186A.
English language translation of Abstract for CN101815383A.
English language translation of Abstract for CN101742771A.

* cited by examiner

US 8,508,150 B2

CONTROLLERS, SYSTEMS AND METHODS FOR CONTROLLING DIMMING OF LIGHT SOURCES

RELATED APPLICATIONS

This application is a continuation-in-part of U.S. patent application, Ser. No. 12/415,028, filed on Mar. 31, 2009, which itself is a continuation-in-part of U.S. patent application Ser. No. 12/316,480, filed Dec. 12, 2008, now U.S. Pat. No. 8,044,608, and both of which are fully incorporated herein by reference. This application is also a continuation-in-part of U.S. patent application Ser. No. 12/761, 681, filed on Apr. 16, 2010, which is hereby incorporated by reference in its entirety. This application also claims priority to Chinese Patent Application No. 201010119888.2, filed on Mar. 4, 2010, with the State Intellectual Property Office of the People's Republic of China.

BACKGROUND

In recent years, light sources such as light emitting diodes (LEDs) have been improved through technological advances in material and manufacturing processes. LED possesses relatively high efficiency, long life, vivid colors and can be used in a variety of industries including the automotive, computer, telecom, military and consumer goods, etc. One example is an LED lamp which uses LEDs to replace traditional light sources such as electrical filament.

FIG. 1 shows a schematic diagram of a conventional LED driving circuit 100. The LED driving circuit 100 utilizes an LED string 106 as a light source. The LED string 106 includes a group of LEDs connected in series. A power converter 102 converts an input voltage Vin to a desired output DC voltage Vout for powering the LED string 106. A switch 104 coupled to the power converter 102 can enable or disable the input voltage Vin to the LED string 106, and therefore can turn on or turn off the LED lamp. The power converter 102 receives a feedback signal from a current sensing resistor Rsen and adjusts the output voltage Vout to make the LED string 106 generate a desired light output. One of the drawbacks of this solution is that a desired light output is predetermined. In operation, the light output of the LED string 106 is set to a predetermined level and may not be adjusted by users.

FIG. 2 illustrates a schematic diagram of another conventional LED driving circuit 200. A power converter 102 converts an input voltage Vin to a desired output DC voltage Vout for powering the LED string 106. A switch 104 coupled to the power converter 102 can enable or disable the input voltage Vin to the LED string 106, and therefore can turn on or turn off the LED lamp. The LED string 106 is coupled to a linear LED current regulator 208. Operational amplifiers 210 in the linear LED current regulator 208 compares a reference signal REF and a current monitoring signal from current sensing resistor Rsen, and generates a control signal to adjust the resistance of transistor Q1 in a linear mode. Therefore, the LED current flowing through the LED string 106 can be adjusted accordingly. In this solution, in order to control the light output of the LED string 106, users may need to use a dedicated apparatus, such as a specially designed switch with adjusting buttons or a switch that can receive a remote control signal, to adjust the reference signal REF.

SUMMARY

In one embodiment, a controller for controlling dimming of an LED light source includes a control terminal and dimming control circuitry coupled to the control terminal. The control terminal provides a driving signal to control a control switch coupled to the LED light source, thereby controlling the dimming of the LED light source. The dimming control circuitry generates the driving signal according to a set of operations of a power switch that transfers an AC signal. The dimming control circuitry further adjusts the driving signal by counting multiple waves of the AC signal to control the dimming of the LED light source.

BRIEF DESCRIPTION OF THE DRAWINGS

Features and advantages of embodiments of the claimed subject matter will become apparent as the following detailed description proceeds, and upon reference to the drawings, wherein like numerals depict like parts, and in which:

DETAILED DESCRIPTION

Reference will now be made in detail to the embodiments of the present invention. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

Figure 1:
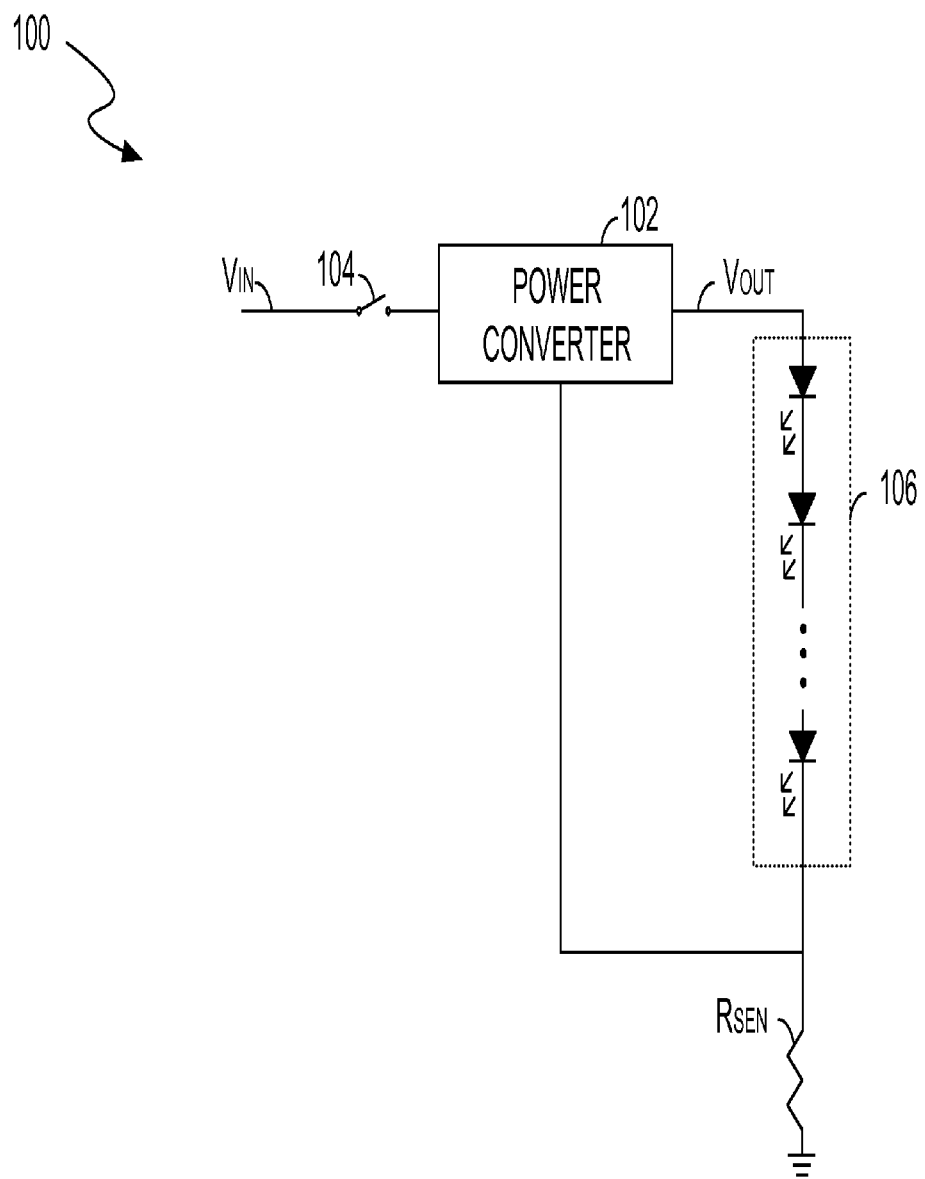
FIG. 1 shows a schematic diagram of a conventional LED driving circuit.
Figure 2:
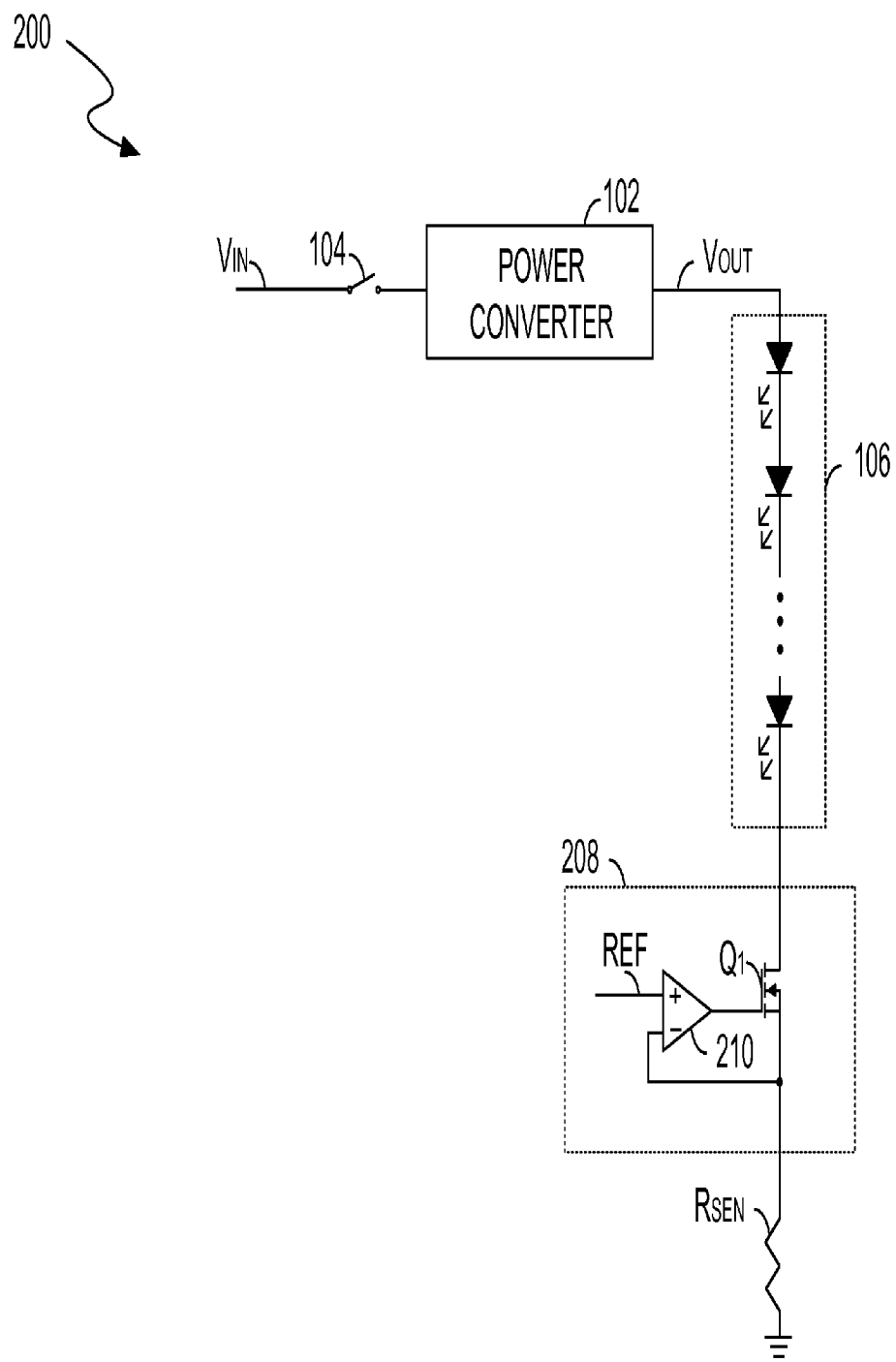
FIG. 2 shows a schematic diagram of another conventional LED driving circuit.
Figure 3:
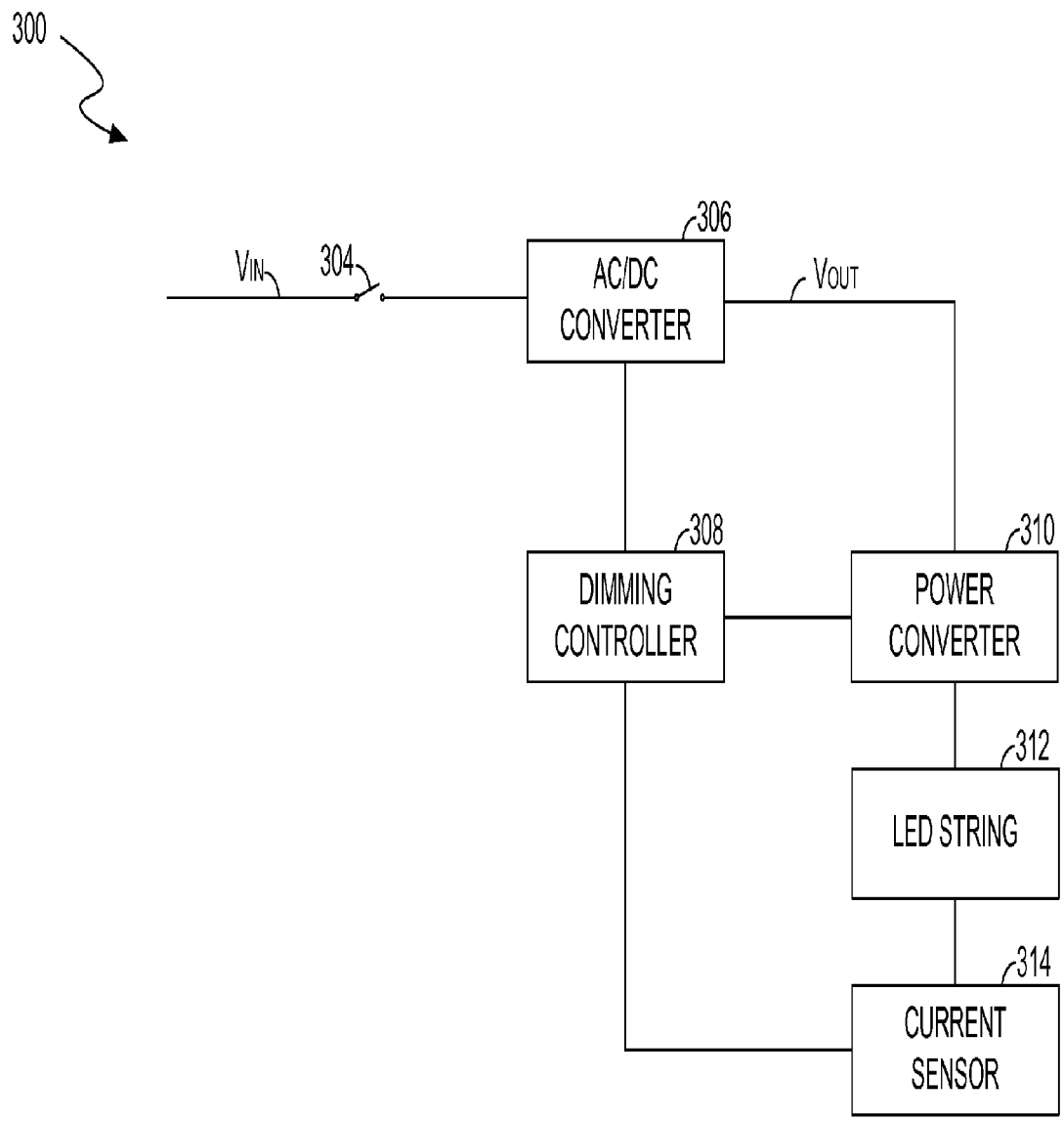
FIG. 3 shows a block diagram of a light source driving circuit, in accordance with one embodiment of the present invention.

FIG. 3 shows an example of a block diagram of a light source driving circuit 300, in accordance with one embodiment of the present invention. In one embodiment, the light source driving circuit 300 includes an AC/DC converter 306 for converting an AC input voltage $V_{IN}$ from a power source to a DC voltage $V_{OUT}$, a power switch 304 coupled between the power source and the AC/DC converter 306 for selectively coupling the power source to the light source driving circuit 300, a power converter 310 coupled to the AC/DC converter 306 for providing an LED string 312 with a regulated power, a dimming controller 308 coupled to the power converter 310 for receiving a switch monitoring signal indicative of an operation of the power switch 304 and for adjusting the regulated power from the power converter 310 according to the switch monitoring signal, and a current sensor 314 for sensing an LED current flowing through the LED string 312. In one embodiment, the power switch 304 can be an on/off switch mounted on the wall.

In operation, the AC/DC converter 306 converts the input AC voltage $V_{IN}$ to the output DC voltage $V_{OUT}$. The power converter 310 receives the DC voltage $V_{OUT}$ and provides the LED string 312 with a regulated power. The current sensor 314 generates a current monitoring signal indicating a level of an LED current flowing through the LED string 312. The dimming controller 308 monitors the operation of the power switch 304, receives the current monitoring signal from the current sensor 314, and is operable for controlling the power converter 310 to adjust power of the LED string 312 in response to the operation of the power switch 304. In one embodiment, the dimming controller 308 operates in an analog dimming mode and adjusts the power of the LED string 312 by adjusting a reference signal indicating a peak value of the LED current. In another embodiment, the dimming controller 308 operates in a burst dimming mode and adjusts the power of the LED string 312 by adjusting a duty cycle of a pulse width modulation (PWM) signal. By adjusting the power of the LED string 312, the light output of the LED string 312 can be adjusted accordingly.

Figure 4:
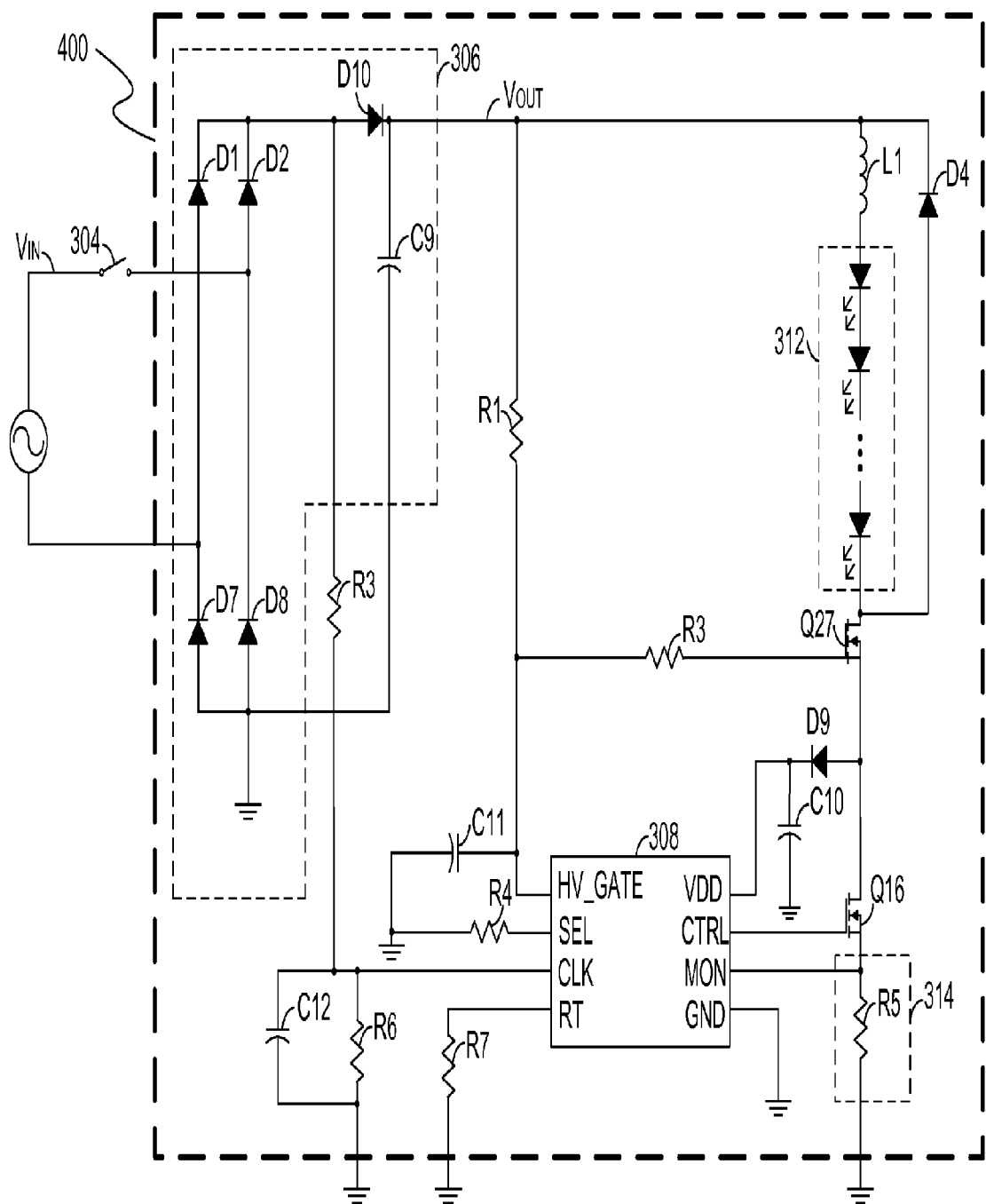
FIG. 4 shows a schematic diagram of a light source driving circuit, in accordance with one embodiment of the present invention.

FIG. 4 shows an example of a schematic diagram of a light source driving circuit 400, in accordance with one embodiment of the present invention. FIG. 4 is described in combination with FIG. 3. Elements labeled the same as in FIG. 3 have similar functions and will not be detailed described herein.

The light source driving circuit 400 includes a power converter 310 (shown in FIG. 3) coupled to a power source and coupled to an LED string 312 for receiving power from the power source and for providing a regulated power to the LED string 312. In the example of FIG. 4, the power converter 310 can be a buck converter including an inductor L1, a diode D4 and a control switch Q16. In the embodiment shown in FIG. 4, the control switch Q16 is implemented outside the dimming controller 308. In another embodiment, the control switch Q16 can be integrated in the dimming controller 308.

A dimming controller 308 is operable for receiving a switch monitoring signal indicative of an operation of a power switch, e.g., a power switch 304 coupled between the power source and the light source driving circuit, and for adjusting the regulated power from the power converter 310 (including the inductor L1, the diode D4 and the control switch Q16) by controlling the control switch Q16 coupled in series with the LED string 312 according to the switch monitoring signal. The light source driving circuit 400 can further include an AC/DC converter 306 for converting an AC input voltage $V_{IN}$ to a DC output voltage $V_{OUT}$, and a current sensor 314 for sensing an LED current flowing through the LED string 312. In the example of FIG. 4, the AC/DC converter 306 can be a bridge rectifier including diodes D1, D2, D7, D8, D10, and a capacitor C9. The current sensor 314 can include a current sensing resistor R5.

In one embodiment, terminals of the dimming controller 308 can include HV_GATE, SEL, CLK, RT, VDD, CTRL, MON and GND. The terminal HV_GATE is coupled to a switch Q27 through a resistor R3 for controlling a conductance status, e.g., ON/OFF status, of the switch Q27 coupled to the LED string 312. A capacitor C11 is coupled between the terminal HV_GATE and ground for regulating a gate voltage of the switch Q27.

A user can select a dimming mode, e.g., an analog dimming mode or a burst dimming mode, by coupling the terminal SEL to ground through a resistor R4 (as shown in FIG. 4), or coupling the terminal SEL to ground directly.

The terminal CLK is coupled to the AC/DC converter 306 through a resistor R3, and is coupled to ground through a resistor R6. The terminal CLK can receive a switch monitoring signal indicating an operation of the power switch 304. In one embodiment, the switch monitoring signal can be generated at a common node between the resistor R3 and the resistor R6. A capacitor C12 is coupled to the resistor R6 in parallel for filtering undesired noises. The terminal RT is coupled to ground through a resistor R7 for determining a frequency of a pulse signal generated by the dimming controller 308.

The terminal VDD is coupled to the switch Q27 through a diode D9 for supplying power to the dimming controller 308. In one embodiment, an energy storage unit, e.g., a capacitor C10, coupled between the terminal VDD and ground can power the dimming controller 308 when the power switch 304 is turned off. In an alternate embodiment, the energy storage unit can be integrated in the dimming controller 308. The terminal GND is coupled to ground.

The terminal CTRL is coupled to the control switch Q16. The control switch Q16 is coupled in series with the LED string 312 and the switch Q27, and is coupled to ground through the current sensing resistor R5. The dimming controller 308 is operable for adjusting the regulated power from the power converter 310 by controlling a conductance status, e.g., ON and OFF status, of the control switch Q16 using a control signal via the terminal CTRL. The terminal MON is coupled to the current sensing resistor R5 for receiving a current monitoring signal indicating an LED current flowing through the LED string 312. When the switch Q27 is turned on, the dimming controller 308 can adjust the LED current flowing through the LED string 312 to ground by controlling the control switch Q16.

In operation, when the power switch 304 is turned on, the AC/DC converter 306 converts an input AC voltage $V_{IN}$ to a DC voltage $V_{OUT}$. A predetermined voltage at the terminal HV_GATE is supplied to the switch Q27 through the resistor R3 so that the switch Q27 is turned on.

If the dimming controller 308 turns on the control switch Q16, the DC voltage $V_{OUT}$ powers the LED string 312 and charges the inductor L1. An LED current flows through the inductor L1, the LED string 312, the switch Q27, the control switch Q16, the current sensing resistor R5 to ground. If the dimming controller 308 turns off the control switch Q16, an LED current flows through the inductor L1, the LED string 312 and the diode D4. The inductor L1 is discharged to power the LED string 312. As such, the dimming controller 308 can adjust the regulated power from the power converter 310 by controlling the control switch Q16.

When the power switch 304 is turned off, the capacitor C10 is discharged to power the dimming controller 308. A voltage across the resistor R6 drops to zero, therefore a switch monitoring signal indicating a turn-off operation of the power switch 304 can be detected by the dimming controller 308 through the terminal CLK. Similarly, when the power switch 304 is turned on, the voltage across the resistor R6 rises to a predetermined voltage, therefore a switch monitoring signal indicating a turn-on operation of the power switch 304 can be detected by the dimming controller 308 through the terminal CLK. If a turn-off operation is detected, the dimming controller 308 can turn off the switch Q27 by pulling the voltage at the terminal HV_GATE to zero such that the LED string 312 can be turned off after the inductor L1 completes discharging. In response to the turn-off operation, the dimming controller 308 can adjust a reference signal indicating a target light output of the LED string 312. Therefore, when the power switch 304 is turned on next time, the LED string 312 can generate a light output according to the adjusted target light output. In other words, the light output of the LED string 312 can be adjusted by the dimming controller 308 in response to the turn-off operation of the power switch 304.

Figure 5:
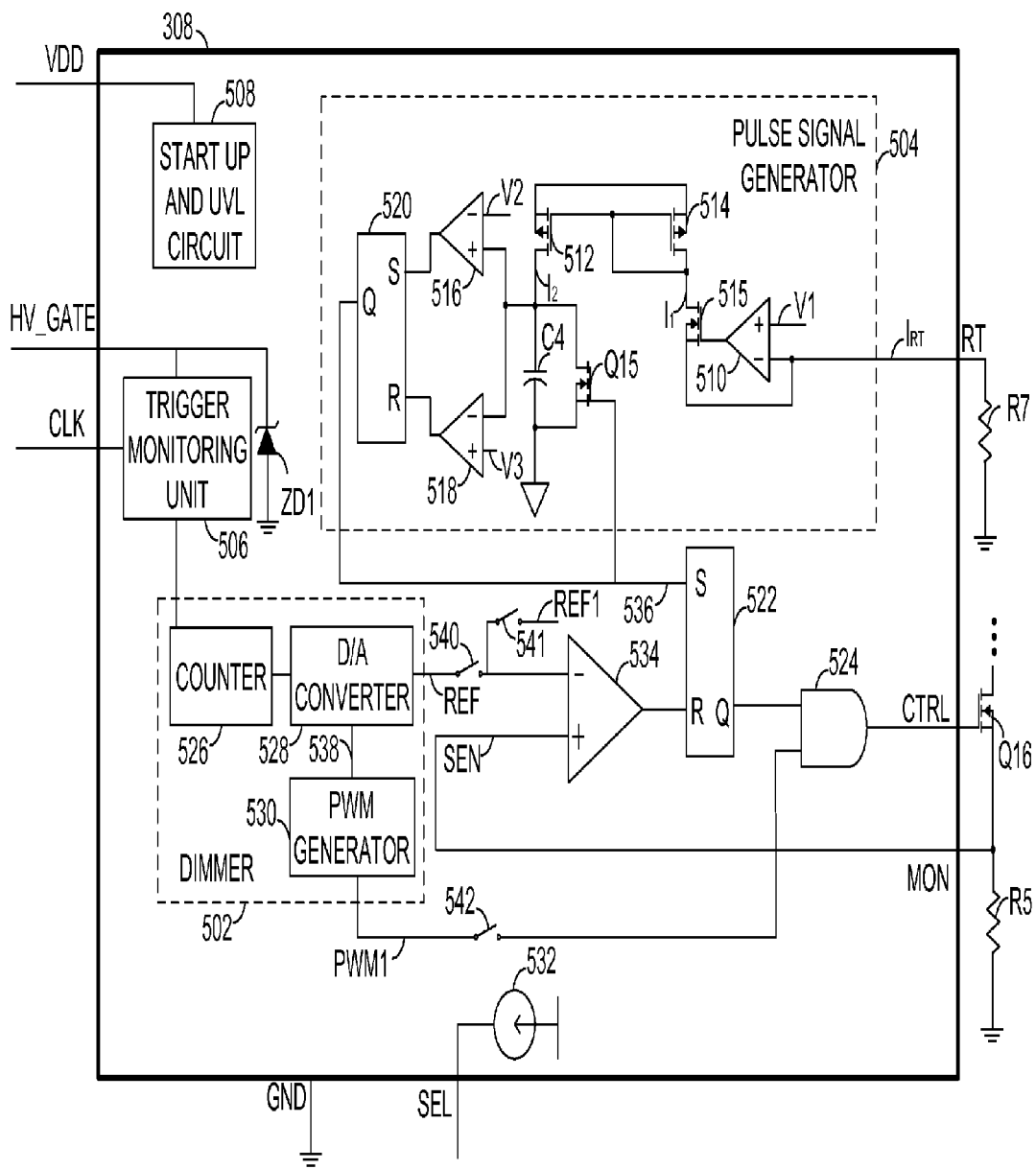
FIG. 5 shows a structure of a dimming controller in FIG. 4, in accordance with one embodiment of the present invention.

FIG. 5 shows an example of a structure of the dimming controller 308 in FIG. 4, in accordance with one embodiment of the present invention. FIG. 5 is described in combination with FIG. 4. Elements labeled the same as in FIG. 4 have similar functions and will not be detailed described herein.

The dimming controller 308 includes a trigger monitoring unit 506, a dimmer 502 and a pulse signal generator 504. The trigger monitoring unit 506 is coupled to ground through a Zener diode ZD1. The trigger monitoring unit 506 can receive a switch monitoring signal indicating an operation of the external power switch 304 through the terminal CLK and can generate a driving signal for driving a counter 526 when an operation of the external power switch 304 is detected at the terminal CLK. The trigger monitoring unit 506 is further operable for controlling a conductance status of the switch Q27. The dimmer 502 is operable for generating a reference signal REF to adjust power of the LED string 312 in an analog dimming mode, or generating a control signal 538 for adjusting a duty cycle of a PWM signal PWM1 to adjust the power of the LED string 312. The pulse signal generator 504 is operable for generating a pulse signal which can turn on a control switch Q16. The dimming controller 308 can further include a start up and under voltage lockout (UVL) circuit 508 coupled to the terminal VDD for selectively turning on one or more components of the dimming controller 308 according to different power condition.

In one embodiment, the start up and under voltage lockout circuit 508 is operable for turning on all the components of the dimming controller 308 when the voltage at the terminal VDD is greater than a first predetermined voltage. When the power switch 304 is turned off, the start up and under voltage lockout circuit 508 is operable for turning off other components of the dimming controller 308 except the trigger monitoring unit 506 and the dimmer 502 when the voltage at the terminal VDD is less than a second predetermined voltage, in order to save energy. The start up and under voltage lockout circuit 508 is further operable for turning off the trigger monitoring unit 506 and the dimmer 502 when the voltage at the terminal VDD is less than a third predetermined voltage. In one embodiment, the first predetermined voltage is greater than the second predetermined voltage and the second predetermined voltage is greater than the third predetermined voltage. Because the dimming controller 308 can be powered by the capacitor C10 through the terminal VDD, the trigger monitoring unit 506 and the dimmer 502 can still operate for a time period after the power switch 304 is turned off.

In the dimming controller 308, the terminal SEL is coupled to a current source 532. Users can choose a dimming mode by configuring the terminal SEL, e.g., by coupling the terminal SEL directly to ground or coupling the terminal SEL to ground via a resistor. In one embodiment, the dimming mode can be determined by measuring a voltage at the terminal SEL. If the terminal SEL is directly coupled to ground, the voltage at the terminal SEL is approximately equal to zero. A control circuit can in turn switch on a switch 540, switch off a switch 541 and switch off a switch 542. Therefore, the dimming controller 308 can work in an analog dimming mode and can adjust the power of the LED string 312 (shown in FIG. 4) by adjusting a reference signal REF. In one embodiment, if the terminal SEL is coupled to ground via a resistor R4 having a predetermined resistance (as shown in FIG. 4), the voltage at the terminal SEL can be greater than zero. The control circuit can in turn switch off the switch 540, switch on the switch 541 and switch on the switch 542. Therefore, the dimming controller 308 can work in a burst dimming mode and can adjust the power of the LED string 312 (shown in FIG. 4) by adjusting a duty cycle of a PWM signal PWM1. In other words, different dimming modes can be selected by controlling the ON/OFF status of the switch 540, switch 541 and switch 542. The ON/OFF status of the switch 540, switch 541 and switch 542 can be determined by the voltage at the terminal SEL.

The pulse signal generator 504 is coupled to ground through the terminal RT and the resistor R7 for generating a pulse signal 536 which can turn on the control switch Q16.

The pulse signal generator 504 can have different configurations and is not limited to the configuration as shown in the example of FIG. 5.

In the pulse signal generator 504, the non-inverting input of an operational amplifier 510 receives a predetermined voltage V1. Thus, the voltage of the inverting input of the operational amplifier 510 can be forced to V1. A current IRT flows through the terminal RT and the resistor R7 to ground. A current I1 flowing through a MOSFET 514 and a MOSFET 515 is equal to IRT. Because the MOSFET 514 and a MOSFET 512 constitute a current mirror, a current I2 flowing through the MOSFET 512 is also substantially equal to IRT. The output of a comparator 516 and the output of a comparator 518 are respectively coupled to the S input and the R input of an SR flip-flop 520. The inverting input of the comparator 516 receives a predetermined voltage V2. The non-inverting input of the comparator 518 receives a predetermined voltage V3. V2 is greater than V3, and V3 is greater than zero, in one embodiment. A capacitor C4 is coupled between the MOSFET 512 and ground, and has one end coupled to a common node between the non-inverting input of the comparator 516 and the inverting input of the comparator 518. The Q output of the SR flip-flop 520 is coupled to the switch Q15 and the S input of an SR flip-flop 522. The switch Q15 is coupled in parallel with the capacitor C4. A conductance status, e.g., ON/OFF status, of the switch Q15 can be determined by the Q output of the SR flip-flop 520.

Initially, the voltage across the capacitor C4 is approximately equal to zero which is less than V3. Therefore, the R input of the SR flip-flop 520 receives a digital 1 from the output of the comparator 518. The Q output of the SR flip-flop 520 is set to digital 0, which turns off the switch Q15. When the switch Q15 is turned off, the voltage across the capacitor C4 increases as the capacitor C4 is charged by I2. When the voltage across C4 is greater than V2, the S input of the SR flip-flop 520 receives a digital 1 from the output of the comparator 516. The Q output of the SR flip-flop 520 is set to digital 1, which turns on the switch Q15. When the switch Q15 is turned on, the voltage across the capacitor C4 decreases as the capacitor C4 discharges through the switch Q15. When the voltage across the capacitor C4 drops below V3, the comparator 518 outputs a digital 1, and the Q output of the SR flip-flop 520 is set to digital 0, which turns off the switch Q15. Then the capacitor C4 is charged by I2 again. As such, through the process described above, the pulse signal generator 504 can generate a pulse signal 536 which includes a series of pulses at the Q output of the SR flip-flop 520. The pulse signal 536 is sent to the S input of the SR flip-flop 522.

The trigger monitoring unit 506 is operable for monitoring an operation of the power switch 304 through the terminal CLK, and is operable for generating a driving signal for driving the counter 526 when an operation of the power switch 304 is detected at the terminal CLK. In one embodiment, when the power switch 304 is turned on, the voltage at the terminal CLK rises to a level that is equal to a voltage across the resistor R6 (shown in FIG. 4). When the power switch 304 is turned off, the voltage at the terminal CLK drops to zero. Therefore, a switch monitoring signal indicating the operation of the power switch 304 can be detected at the terminal CLK. In one embodiment, the trigger monitoring unit 506 generates a driving signal when a turn-off operation is detected at the terminal CLK.

The trigger monitoring unit 506 is further operable for controlling a conductance status of the switch Q27 through the terminal HV_GATE. When the power switch 304 is turned on, a breakdown voltage across the Zener diode ZD1 is applied to the switch Q27 through the resistor R3. Therefore, the switch Q27 can be turned on. The trigger monitoring unit 506 can turn off the switch Q27 by pulling the voltage at the terminal HV_GATE to zero. In one embodiment, the trigger monitoring unit 506 turns off the switch Q27 when a turn-off operation of the power switch 304 is detected at the terminal CLK and turns on the switch Q27 when a turn-on operation of the power switch 304 is detected at the terminal CLK.

In one embodiment, the dimmer 502 includes a counter 526 coupled to the trigger monitoring unit 506 for counting operations of the power switch 304, a digital-to-analog converter (D/A converter) 528 coupled to the counter 526. The dimmer 502 can further include a PWM generator 530 coupled to the D/A converter 528. The counter 526 can be driven by the driving signal generated by the trigger monitoring unit 506. More specifically, when the power switch 304 is turned off, the trigger monitoring unit 506 detects a negative edge of the voltage at the terminal CLK and generates a driving signal, in one embodiment. The counter value of the counter 526 can be increased, e.g., by 1, in response to the driving signal. The D/A converter 528 reads the counter value from the counter 526 and generates a dimming signal (e.g., control signal 538 or reference signal REF) based on the counter value. The dimming signal can be used to adjust a target power level of the power converter 310, which can in turn adjust the light output of the LED string 312.

In the burst dimming mode, the switch 540 is off, the switch 541 and the switch 542 are on. The inverting input of the comparator 534 receives a reference signal REF1 which can be a DC signal having a predetermined substantially constant voltage. The voltage of REF1 can determine a peak value of the LED current, which can in turn determine the maximum light output of the LED string 312. The dimming signal can be a control signal 538 which is applied to the PWM generator 530 for adjusting a duty cycle of the PWM signal PWM1. By adjusting the duty cycle of PWM1, the light output of the LED string 312 can be adjusted no greater than the maximum light output determined by REF1. For example, if PWM1 has a duty cycle of 100%, the LED string 312 can have the maximum light output. If the duty cycle of PWM1 is less than 100%, the LED string 312 can have a light output that is lower than the maximum light output.

In the analog dimming mode, the switch 540 is on, the switch 541 and the switch 542 are off, and the dimming signal can be an analog reference signal REF having an adjustable voltage. The D/A converter 528 can adjust the voltage of the reference signal REF according to the counter value of the counter 526. The voltage of REF can determine a peak value of the LED current, which can in turn determine an average value of the LED current. As such, the light output of the LED string 312 can be adjusted by adjusting the reference signal REF.

In one embodiment, the D/A converter 528 can decrease the voltage of REF in response to an increase of the counter value. For example, if the counter value is 0, the D/A converter 528 adjusts the reference signal REF to have a voltage V4. If the counter value is increased to 1 when a turn-off operation of the power switch 304 is detected at the terminal CLK by the trigger monitoring unit 506, the D/A converter 528 adjusts the reference signal REF to have a voltage V5 that is less than V4. Yet in another embodiment, the D/A converter 528 can increase the voltage of REF in response to an increase of the counter value.

In one embodiment, the counter value will be reset to zero after the counter 526 reaches its maximum counter value. For example, if the counter 526 is a 2-bit counter, the counter value will increase from 0 to 1, 2, 3 and then return to zero after four turn-off operations have been detected. Accordingly, the light output of the LED string 312 can be adjusted from a first level to a second level, then to a third level, then to a fourth level, and then back to the first level.

The inverting input of a comparator 534 can selectively receive the reference signal REF and the reference signal REF1. For example, the inverting input of the comparator 534 receives the reference signal REF through the switch 540 in the analog dimming mode, and receives the reference signal REF1 through the switch 541 in the burst dimming mode. The non-inverting input of the comparator 534 is coupled to the resistor R5 through the terminal MON for receiving a current monitoring signal SEN from the current sensing resistor R5. The voltage of the current monitoring signal SEN can indicate an LED current flowing through the LED string 312 when the switch Q27 and the control switch Q16 are turned on.

The output of the comparator 534 is coupled to the R input of the SR flip-flop 522. The Q output of the SR flip-flop 522 is coupled to an AND gate 524. The PWM signal PWM1 generated by the PWM generator 530 is applied to the AND gate 524. The AND gate 524 outputs a control signal to control the control switch Q16 through the terminal CTRL.

If the analog dimming mode is selected, the switch 540 is turned on and the switches 541 and 542 are turned off. The control switch Q16 is controlled by the SR flip-flop 522. In operation, when the power switch 304 is turned on, the breakdown voltage across the Zener diode ZD1 turns on the switch Q27. The SR flip-flop 522 generates a digital 1 at the Q output to turn on the control switch Q16 in response to the pulse signal 536 generated by the pulse generator 504. An LED current flowing through the inductor L1, the LED string 312, the switch Q27, the control switch Q16, the current sensing resistor R5 to ground. The LED current gradually increases because the inductor resists a sudden change of the LED current. As a result, the voltage across the current sensing resistor R5, that is, the voltage of the current monitoring signal SEN can be increased. When the voltage of SEN is greater than that of the reference signal REF, the comparator 534 generates a digital 1 at the R input of the SR flip-flop 522 so that the SR flip-flop 522 generates a digital 0 to turn off the control switch Q16. After the control switch Q16 is turned off, the inductor L1 is discharged to power the LED string 312. An LED current which flows through the inductor L1, the LED string 312 and the diode D4 gradually decreases. The control switch Q16 is turned on when the SR flip-flop 522 receives a pulse at the S input again, and then the LED current flows through the current sensing resistor R5 to ground again. When the voltage of the current monitoring signal SEN is greater than that of the reference signal REF, the control switch Q16 is turned off by the SR flip-flop 522. As described above, the reference signal REF determines a peak value of the LED current, which can in turn determine the light output of the LED string 312. By adjusting the reference signal REF, the light output of the LED string 312 can be adjusted.

In the analog dimming mode, when the power switch 304 is turned off, the capacitor C10 (shown in FIG. 4) is discharged to power the dimming controller 308. The counter value of the counter 526 can be increased by 1 when the trigger monitoring unit 506 detects a turn-off operation of the power switch 304 at the terminal CLK. The trigger monitoring unit 506 can turn off the switch Q27 in response to the turn-off operation of the power switch 304. The D/A converter 528 can adjust the voltage of the reference signal REF from a first level to a second level in response to the change of the counter value. Therefore, the light output of the LED string 312 can be adjusted in accordance with the adjusted reference signal REF when the power switch 304 is turned on.

If the burst dimming mode is selected, the switch 540 is turned off and the switches 541 and 542 are turned on. The inverting input of the comparator 534 receives a reference signal REF1 having a predetermined voltage. The control switch Q16 is controlled by both of the SR flip-flop 522 and the PWM signal PWM1 through the AND gate 524. The reference signal REF1 can determine a peak value of the LED current, which can in turn determine a maximum light output of the LED string 312. The duty cycle of the PWM signal PWM1 can determine the on/off time of the control switch Q16. When the PWM signal PWM1 is logic 1, the conductance status of the control switch Q16 is determined by the Q output of the SR flip-flop 522. When the PWM signal PWM1 is logic 0, the control switch Q16 is turned off. By adjusting the duty cycle of the PWM signal PWM1, the power of the LED string 312 can be adjusted accordingly. As such, the combination of the reference signal REF1 and the PWM signal PWM1 can determine the light output of the LED string 312.

In the burst dimming mode, when the power switch 304 is turned off, a turn-off operation of the power switch 304 can be detected by the trigger monitoring unit 506 at the terminal CLK. The trigger monitoring unit 506 turns off the switch Q27 and generates a driving signal. The counter value of the counter 526 can be increased, e.g., by 1, in response to the driving signal. The D/A converter 528 can generate the control signal 538 to adjust the duty cycle of the PWM signal PWM1 from a first level to a second level. Therefore, when the power switch 304 is turned on next time, the light output of the LED string 312 can be adjusted to follow a target light output which is determined by the reference signal REF1 and the PWM signal PWM1.

Figure 6:
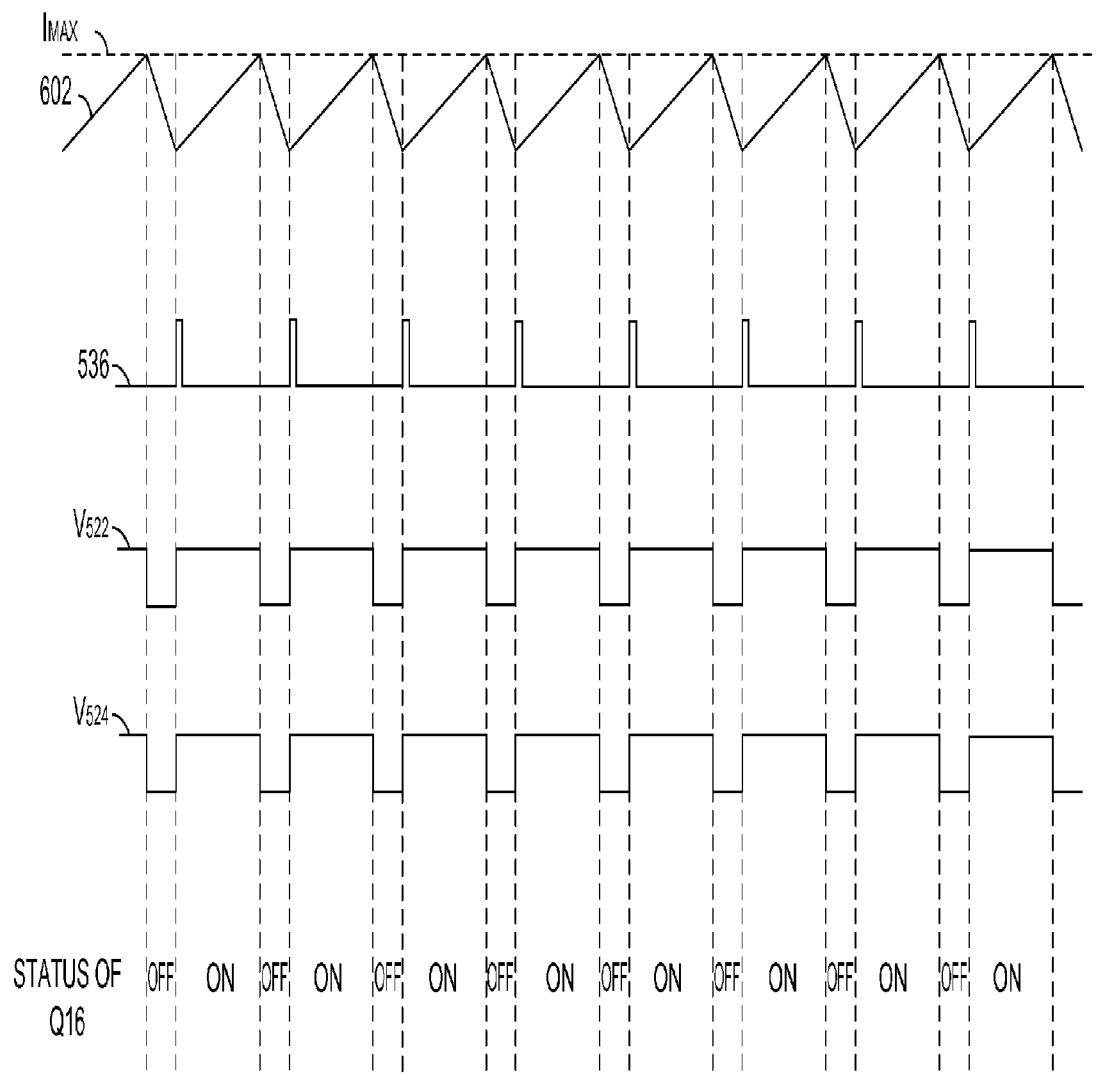
FIG. 6 illustrates signal waveforms in the analog dimming mode, in accordance with one embodiment of the present invention.

FIG. 6 illustrates examples of signal waveforms of an LED current 602 flowing through the LED string 312, the pulse signal 536, V522 which indicates the output of the SR flip-flop 522, V524 which indicates the output of the AND gate 524, and the ON/OFF status of the control switch Q16 in the analog dimming mode. FIG. 6 is described in combination with FIG. 4 and FIG. 5.

In operation, the pulse signal generator 504 generates pulse signal 536. The SR flip-flop 522 generates a digital 1 at the Q output in response to each pulse of the pulse signal 536. The control switch Q16 is turned on when the Q output of the SR flip-flop 522 is digital 1. When the control switch Q16 is turned on, the inductor L1 ramps up and the LED current 602 increases. When the LED current 602 reaches the peak value Imax, which means the voltage of the current monitoring signal SEN is substantially equal to the voltage of the reference signal REF, the comparator 534 generates a digital 1 at the R input of the SR flip-flop 522 so that the SR flip-flop 522 generates a digital 0 at the Q output. The control switch Q16 is turned off when the Q output of the SR flip-flop 522 is digital 0. When the control switch Q16 is turned off, the inductor L1 is discharged to power the LED string 312 and the LED current 602 decreases. In this analog dimming mode, by adjusting the reference signal REF, the average LED current can be adjusted accordingly and therefore the light output of the LED string 312 can be adjusted.

Figure 7:
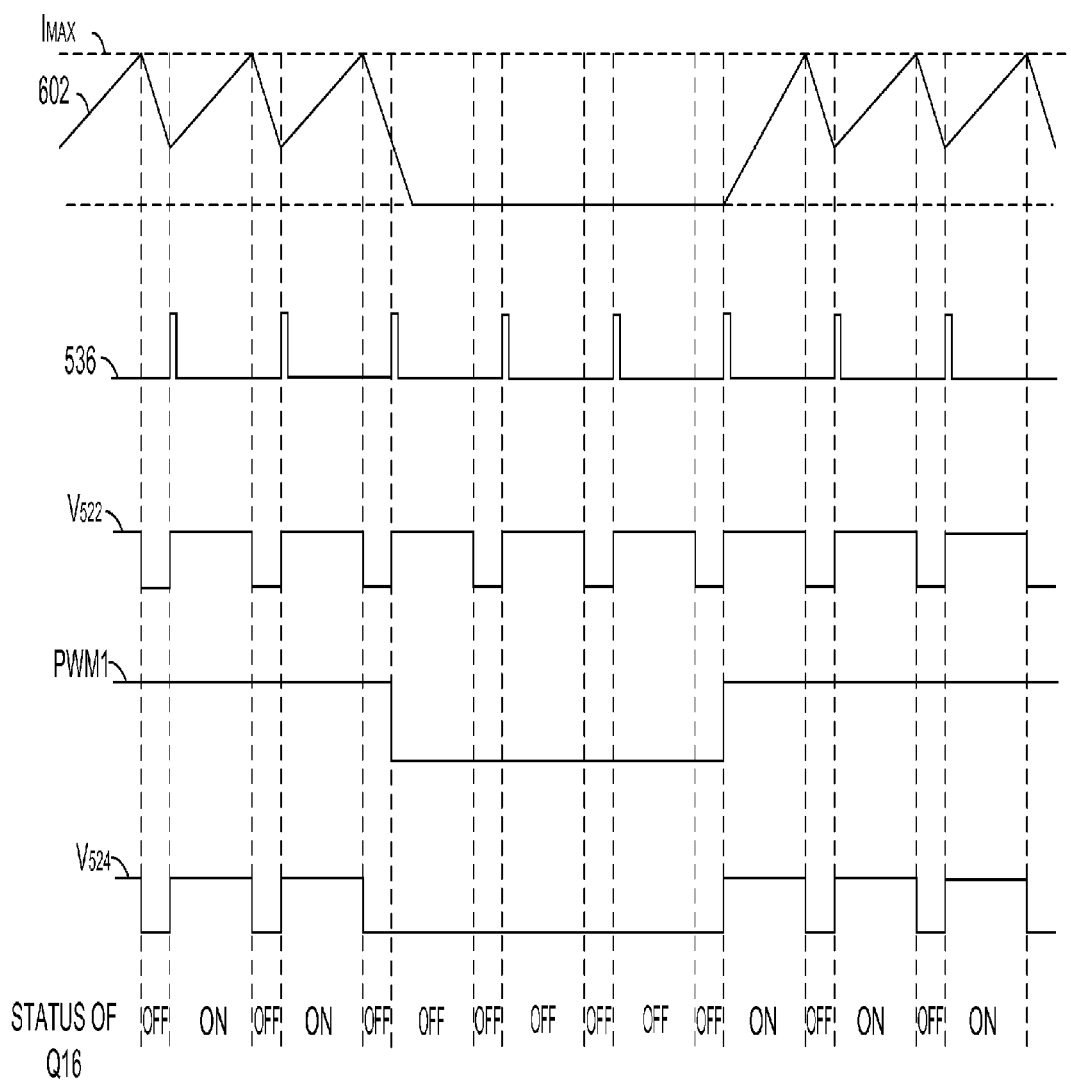
FIG. 7 illustrates signal waveforms in the burst dimming mode, in accordance with one embodiment of the present invention.

FIG. 7 illustrates examples of signal waveforms of the LED current 602 flowing through the LED string 312, the pulse signal 536, V522 which indicates the output of the SR flip-flop 522, V524 which indicates the output of the AND gate 524, and the ON/OFF status of the control switch Q16, and the PMW signal PWM1 in the burst dimming mode. FIG. 7 is described in combination with FIG. 4 and FIG. 5.

When PWM1 is digital 1, the relationship among the LED current 602, the pulse signal 536, V522, V524, and the ON/OFF status of the switch Q1 is similar to that is illustrated in FIG. 6. When PWM1 is digital 0, the output of the AND gate 524 turns to digital 0. Therefore, the control switch Q16 is turned off and the LED current 602 decreases. If the PWM1 holds digital 0 long enough, the LED current 602 can falls to zero. In this burst dimming mode, by adjusting the duty cycle of PWM1, the average LED current can be adjusted accordingly and therefore the light output of the LED string 312 can be adjusted.

Figure 8:
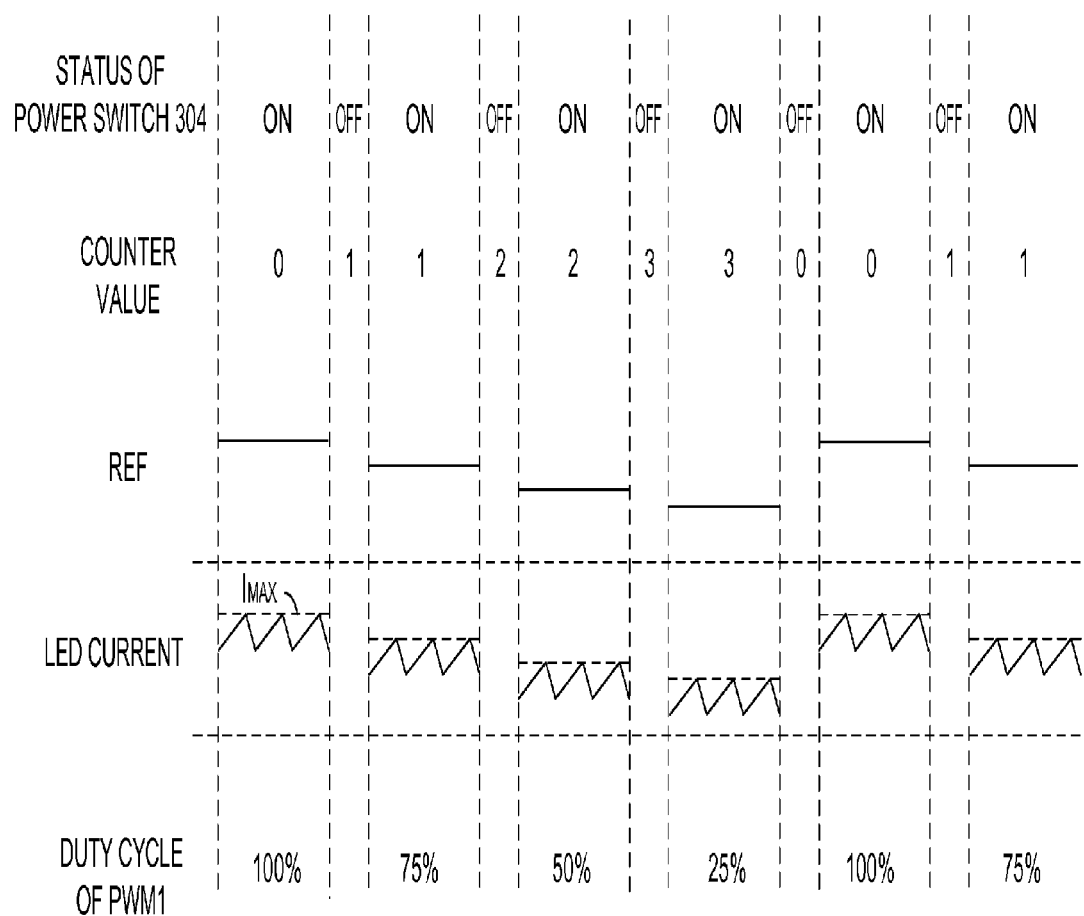
FIG. 8 illustrates a diagram illustrating an operation of a light source driving circuit which includes the dimming controller in FIG. 5, in accordance with one embodiment of the present invention.

FIG. 8 shows an example of a diagram illustrating an operation of a light source driving circuit which includes the dimming controller in FIG. 5, in accordance with one embodiment of the present invention. FIG. 8 is described in combination with FIG. 5.

In the example shown in FIG. 8, each time when a turn-off operation of the power switch 304 is detected by the trigger monitoring unit 506, the counter value of the counter 526 is increases by 1. The counter 526 can be a 2-bit counter which has a maximum counter value of 3.

In the analog dimming mode, the D/A converter 528 reads the counter value from the counter 526 and decreases the voltage of the reference signal REF in response to an increase of the counter value. The voltage of REF can determine a peak value Imax of the LED current, which can in turn determine an average value of the LED current. In the burst dimming mode, the D/A converter 528 reads the counter value from the counter 526 and decreases the duty cycle of the PWM signal PWM1 (e.g., decreases 25% each time) in response to an increase of the counter value. The counter 526 is reset after it reaches its maximum counter value (e.g., 3).

Figure 9:
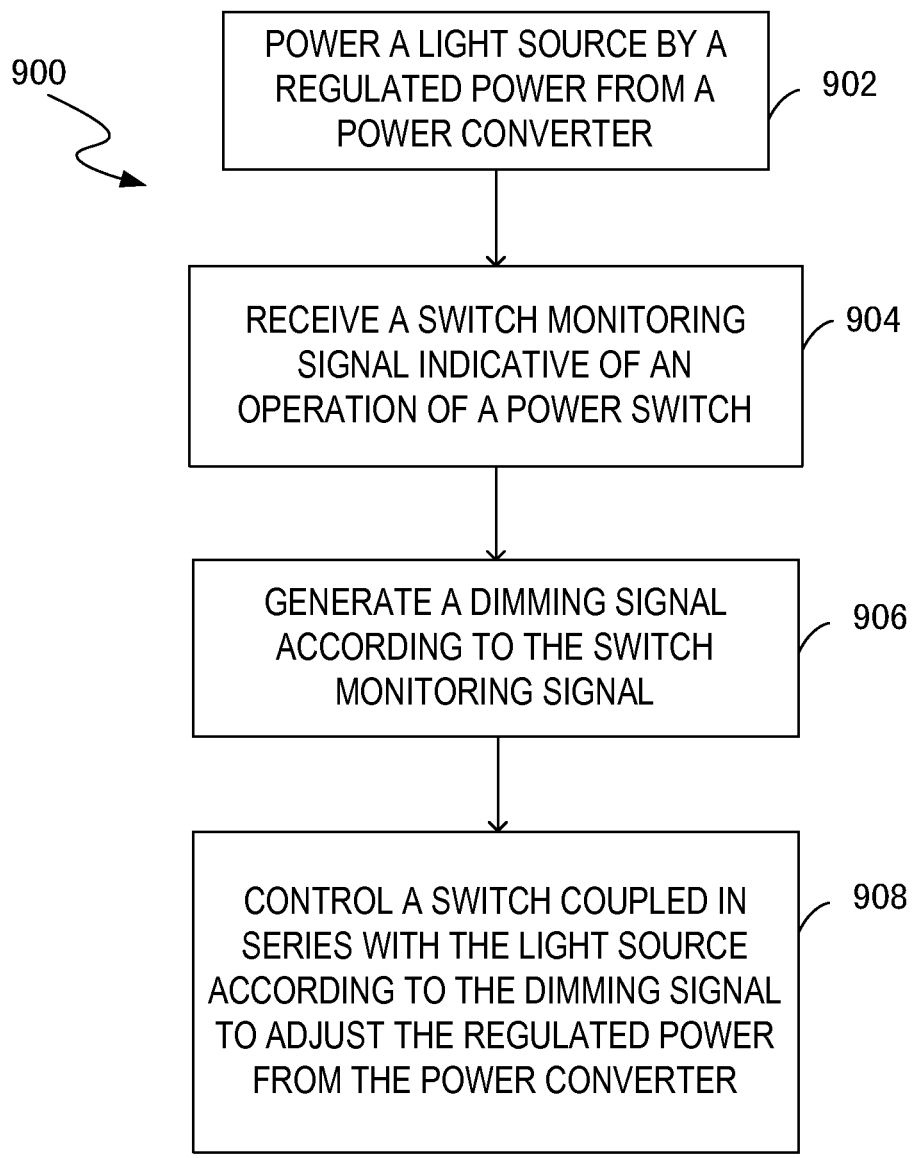
FIG. 9 shows a flowchart of a method for adjusting power of a light source, in accordance with one embodiment of the present invention.

FIG. 9 shows a flowchart 900 of a method for adjusting power of a light source, in accordance with one embodiment of the present invention. FIG. 9 is described in combination with FIG. 4 and FIG. 5.

In block 902, a light source, e.g., the LED string 312, is powered by a regulated power from a power converter, e.g., the power converter 310. In block 904, a switch monitoring signal can be received, e.g., by the dimming controller 308. The switch monitoring signal can indicate an operation of a power switch, e.g., the power switch 304 coupled between a power source and the power converter. In block 906, a dimming signal is generated according to the switch monitoring signal. In block 908, a switch coupled in series with the light source, e.g., the control switch Q16, is controlled according to the dimming signal so as to adjust the regulated power from the power converter. In one embodiment, in an analog dimming mode, the regulated power from the power converter can be adjusted by comparing the dimming signal with a feedback current monitoring signal which indicates a light source current of the light source. In another embodiment, in a burst dimming mode, the regulated power from the power converter can be adjusted by controlling a duty cycle of a PWM signal by the dimming signal.

Accordingly, embodiments in accordance with the present invention provide a light source driving circuit that can adjust power of a light source according to a switch monitoring signal indicative of an operation of a power switch, e.g., an on/off switch mounted on the wall. The power of the light source, which is provided by a power converter, can be adjusted by a dimming controller by controlling a switch coupled in series with the light source. Advantageously, as described above, users can adjust the light output of the light source through an operation (e.g., a turn-off operation) of a common on/off power switch. Therefore, extra apparatus for dimming, such as an external dimmer or a specially designed switch with adjusting buttons, can be avoided and the cost can be reduced.

Figure 10:
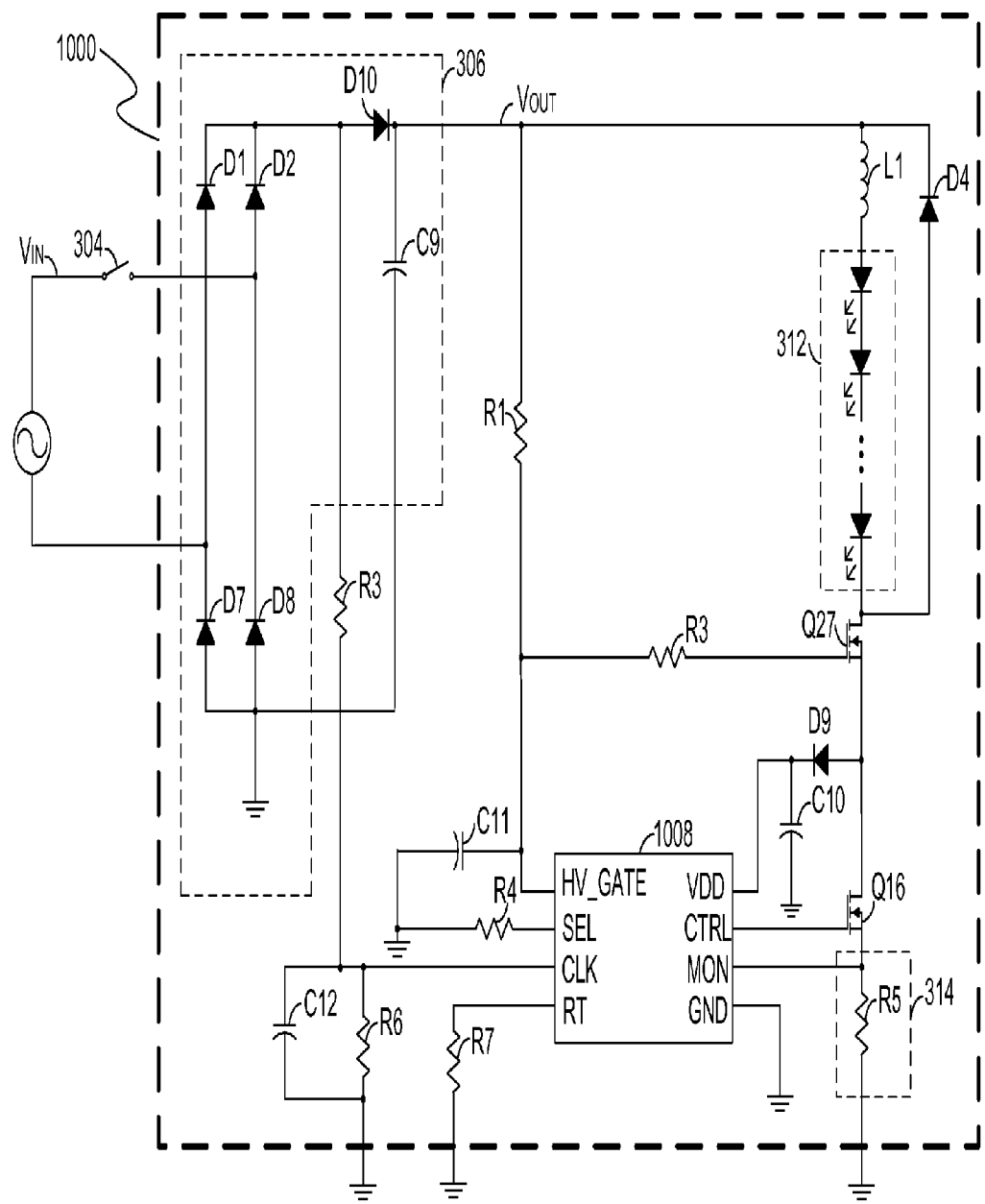
FIG. 10 shows a schematic diagram of a light source driving circuit, in accordance with one embodiment of the present invention.

FIG. 10 shows an example of a schematic diagram of a light source driving circuit 1000, in accordance with one embodiment of the present invention. FIG. 10 is described in combination with FIG. 3. Elements labeled the same as in FIG. 3 and FIG. 4 have similar functions.

The light source driving circuit 1000 includes a power converter 310 coupled to a power source and an LED string 312 for receiving power from the power source and for providing a regulated power to the LED string 312. A dimming controller 1008 is operable for monitoring a power switch 304 coupled between the power source and the light source driving circuit 1000 by monitoring the voltage at a terminal CLK. The dimming controller 1008 is operable for receiving a dimming request signal indicative of a first set of operations of the power switch 304 and for receiving a dimming termination signal indicative of a second set of operations of the power switch 304. The dimming controller 1008 can receive the dimming request signal and the dimming termination signal via the terminal CLK. The dimming controller 1008 is further operable for continuously adjusting the regulated power from the power converter 310 if the dimming request signal is received, and for stopping adjusting the regulated power from the power converter 310 if the dimming termination signal is received. In other words, the dimming controller 1008 can continuously adjust the power from the power converter 310 upon detection of the first set of operations of the power switch 304 until the second set of operations of the power switch 304 are detected. In one embodiment, the dimming controller 1008 can adjust the regulated power from the power converter 310 by controlling a control switch Q16 coupled in series with the LED string 312.

Figure 11:
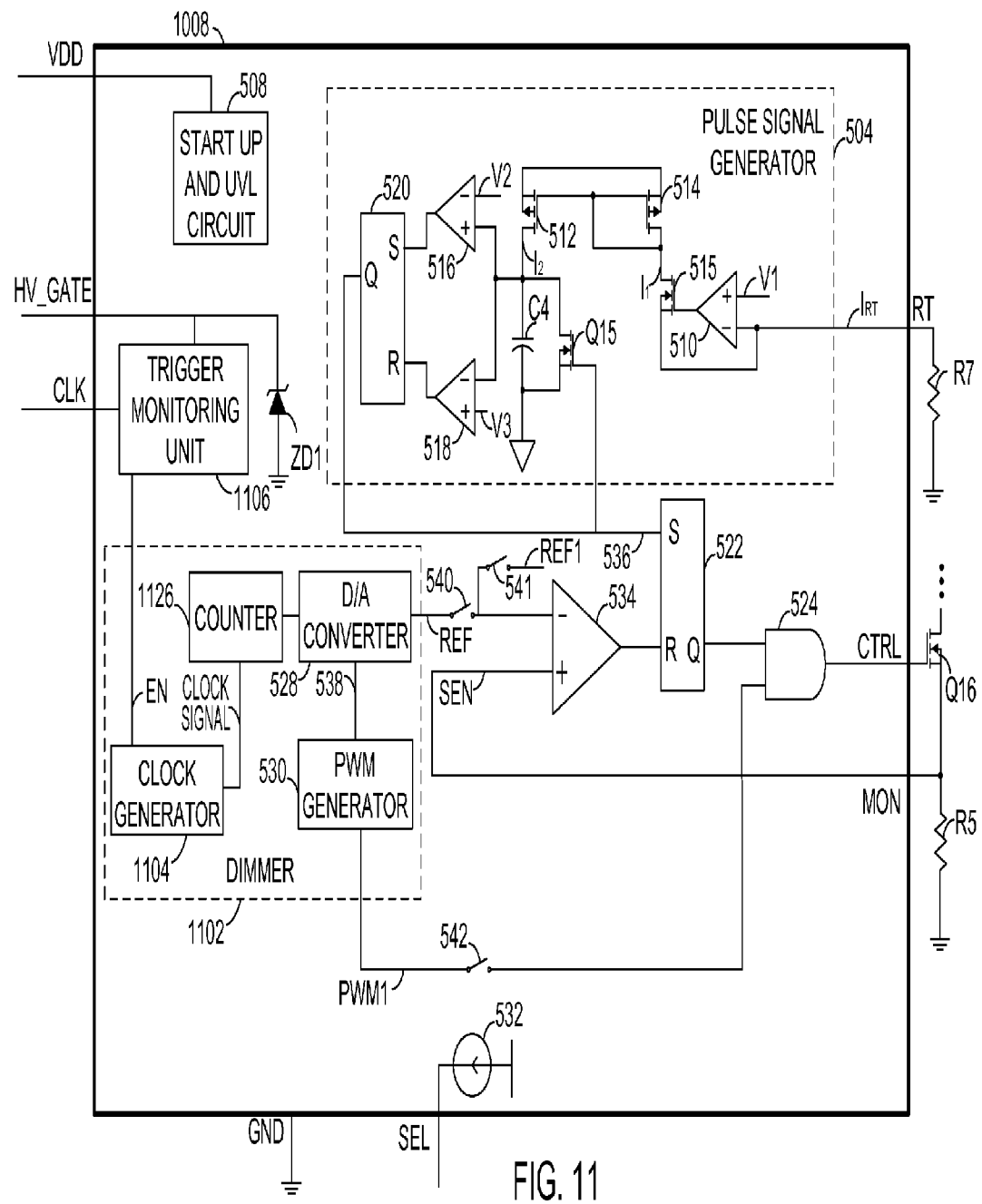
FIG. 11 shows a structure of a dimming controller in FIG. 10, in accordance with one embodiment of the present invention.

FIG. 11 shows an example of a structure of the dimming controller 1008 in FIG. 10, in accordance with one embodiment of the present invention. FIG. 11 is described in combination with FIG. 10. Elements labeled the same as in FIG. 4, FIG. 5 and FIG. 10 have similar functions.

In the example of FIG. 11, the structure of the dimming controller 1008 in FIG. 11 is similar to the structure of the dimming controller 308 in FIG. 5 except for the configuration of the dimmer 1102 and the trigger monitoring unit 1106. In FIG. 11, the trigger monitoring unit 1106 is operable for receiving the dimming request signal and the dimming termination signal via the terminal CLK, and for generating a signal EN to enable or disable a clock generator 1104. The trigger monitoring unit 1106 is further operable for controlling a conductance status of the switch Q27 coupled to the LED string 312.

The dimmer 1102 is operable for generating a reference signal REF to adjust power of the LED string 312 in an analog dimming mode, or generating a control signal 538 for adjusting a duty cycle of a PWM signal PWM1 to adjust the power of the LED string 312 in a burst dimming mode. In the example shown in FIG. 11, the dimmer 1102 can include the clock generator 1104 coupled to the trigger monitoring unit 1106 for generating a clock signal, a counter 1126 driven by the clock signal, a digital-to-analog (D/A) converter 528 coupled to the counter 1126. The dimmer 1102 can further include a PWM generator 530 coupled to the D/A converter 528.

In operation, when the power switch 304 is turned on or turned off, the trigger monitoring unit 1106 can detect a positive edge or a negative edge of the voltage at the terminal CLK. For example, when the power switch 304 is turned off, the capacitor C10 is discharged to power the dimming controller 1108. A voltage across the resistor R6 drops to zero. Therefore, a negative edge of the voltage at the terminal CLK can be detected by the trigger monitoring unit 1106. Similarly, when the power switch 304 is turned on, the voltage across the resistor R6 rises to a predetermined voltage. Therefore, a positive edge of the voltage at the terminal CLK can be detected by the trigger monitoring unit 1106. As such, operations, e.g., turn-on operations or turn-off operations, of the power switch 304 can be detected by the trigger monitoring unit 1106 by monitoring the voltage at the terminal CLK.

In one embodiment, a dimming request signal can be received by the trigger monitoring unit 1106 via the terminal CLK when a first set of operations of the power switch 304 are detected. A dimming termination signal can be received by the trigger monitoring unit 1106 via the terminal CLK when a second set of operations of the power switch 304 are detected. In one embodiment, the first set of operations of the power switch 304 includes a first turn-off operation followed by a first turn-on operation. In one embodiment, the second set of operations of the power switch 304 includes a second turn-off operation followed by a second turn-on operation.

If the dimming request signal is received by the trigger monitoring unit 1106, the dimming controller 1108 begins to continuously adjust the regulated power from the power converter 310. In an analog dimming mode, the dimming controller 1108 adjusts a voltage of a reference signal REF to adjust the regulated power from the power converter 310. In a burst dimming mode, the dimming controller 1108 adjusts a duty cycle of a PWM signal PWM1 to adjust the regulated power from the power converter 310.

If the dimming termination signal is received by the trigger monitoring unit 1106, the dimming controller 1108 can stop adjusting the regulated power from the power converter 310.

Figure 12:
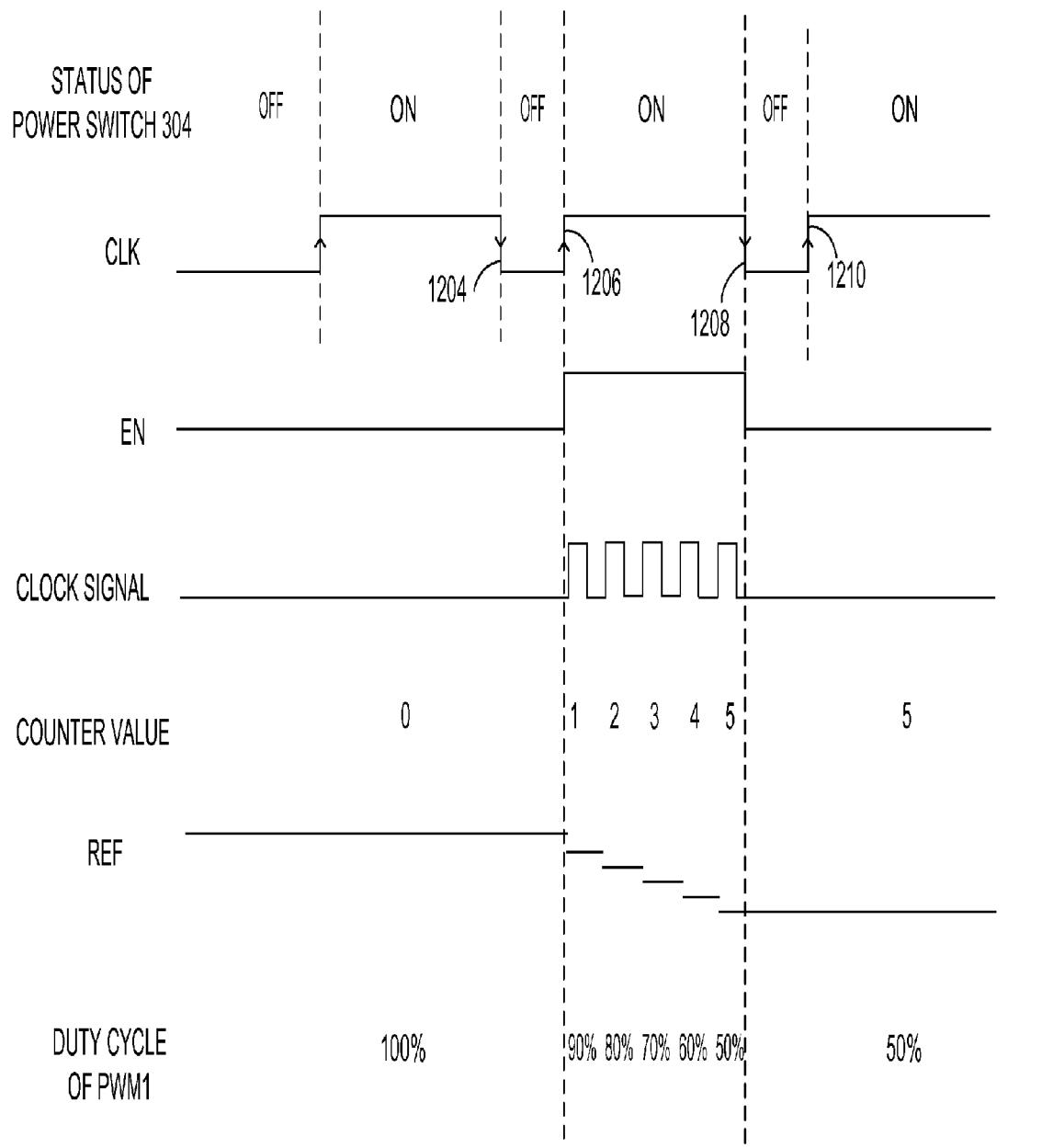
FIG. 12 illustrates a diagram illustrating an operation of a light source driving circuit which includes the dimming controller in FIG. 11, in accordance with one embodiment of the present invention.

FIG. 12 illustrates an example of a diagram illustrating an operation of a light source driving circuit which includes the dimming controller 1008 in FIG. 11, in accordance with one embodiment of the present invention. FIG. 12 is described in combination with FIG. 10 and FIG. 11.

Assume that initially the power switch 304 is off. In operation, when the power switch 304 is turned on, e.g., by a user, the LED string 312 is powered by a regulated power from the power converter 310 to generate an initial light output, in one embodiment. In the analog dimming mode, the initial light output can be determined by an initial voltage of the reference signal REF. In the burst dimming mode, the initial light output can be determined by an initial duty cycle (e.g., 100%) of the PWM signal PWM1. The reference signal REF and the PWM signal PWM1 can be generated by the D/A converter 528 according to a counter value of the counter 1126, in one embodiment. Therefore, the initial voltage of REF and the initial duty cycle of PWM1 can be determined by an initial counter value (e.g., zero) provided by the counter 1126.

In order to adjust the light output of the LED string 312, the user can apply a first set of operations to the power switch 304. A dimming request signal is generated upon detection of the first set of operations of the power switch 304. In one embodiment, the first set of operations can include a first turn-off operation followed by a first turn-on operation. As a result, a dimming request signal including a negative edge 1204 followed by a positive edge 1206 of the voltage at the terminal CLK can be detected and received by the trigger monitoring unit 1106. In response to the dimming request signal, the trigger monitoring unit 1106 can generate a signal EN having a high level. Thus, the clock generator 1104 is enabled to generate a clock signal. The counter 1126 driven by the clock signal can change the counter value in response to each clock pulse of the clock signal. In the example of FIG. 12, the counter value increases in response to the clock signal. In one embodiment, the counter value can be reset to zero after the counter 1126 reaches its predetermined maximum counter value. In another embodiment, the counter value increases until the counter 1126 reaches its predetermined maximum counter value, and then decreases until the counter 1126 reaches its predetermined minimum counter value.

In the analog dimming mode, the D/A converter 528 reads the counter value from the counter 1126 and decreases the voltage of the reference signal REF in response to an increase of the counter value, in one embodiment. In the burst dimming mode, the D/A converter 528 reads the counter value from the counter 1126 and decreases the duty cycle of the PWM signal PWM1 (e.g., decreases 10% each time) in response to an increase of the counter value, in one embodiment. Accordingly, the light output of the LED string 312 can be adjusted because the regulated power from the power converter 310 can be determined by the voltage of the reference signal REF (in the analog dimming mode) or by the duty cycle of the PWM signal PWM1 (in the burst dimming mode).

Once a desired light output has been achieved, the user can terminate the adjustment process by applying a second set of operations to the power switch 304. A dimming termination signal is generated upon detection of the second set of operations of the power switch 304. In one embodiment, the second set of operations can include a second turn-off operation followed by a second turn-on operation. As a result, the dimming termination signal including a negative edge 1208 followed by a positive edge 1210 of the voltage at the terminal CLK can be detected and received by the trigger monitoring unit 1106. Upon detection of the dimming termination signal, the trigger monitoring unit 1106 can generate the signal EN having a low level. Thus, the clock generator 1104 is disabled, such that the counter 1126 can hold its counter value. Accordingly, in the analog dimming mode, the voltage of the reference signal REF can be held at a desired level. In the burst dimming mode, the duty cycle of the PWM signal PWM1 can be held at a desired value. Therefore, the light output of the LED string 312 can be maintained at a desired light output.

Figure 13:
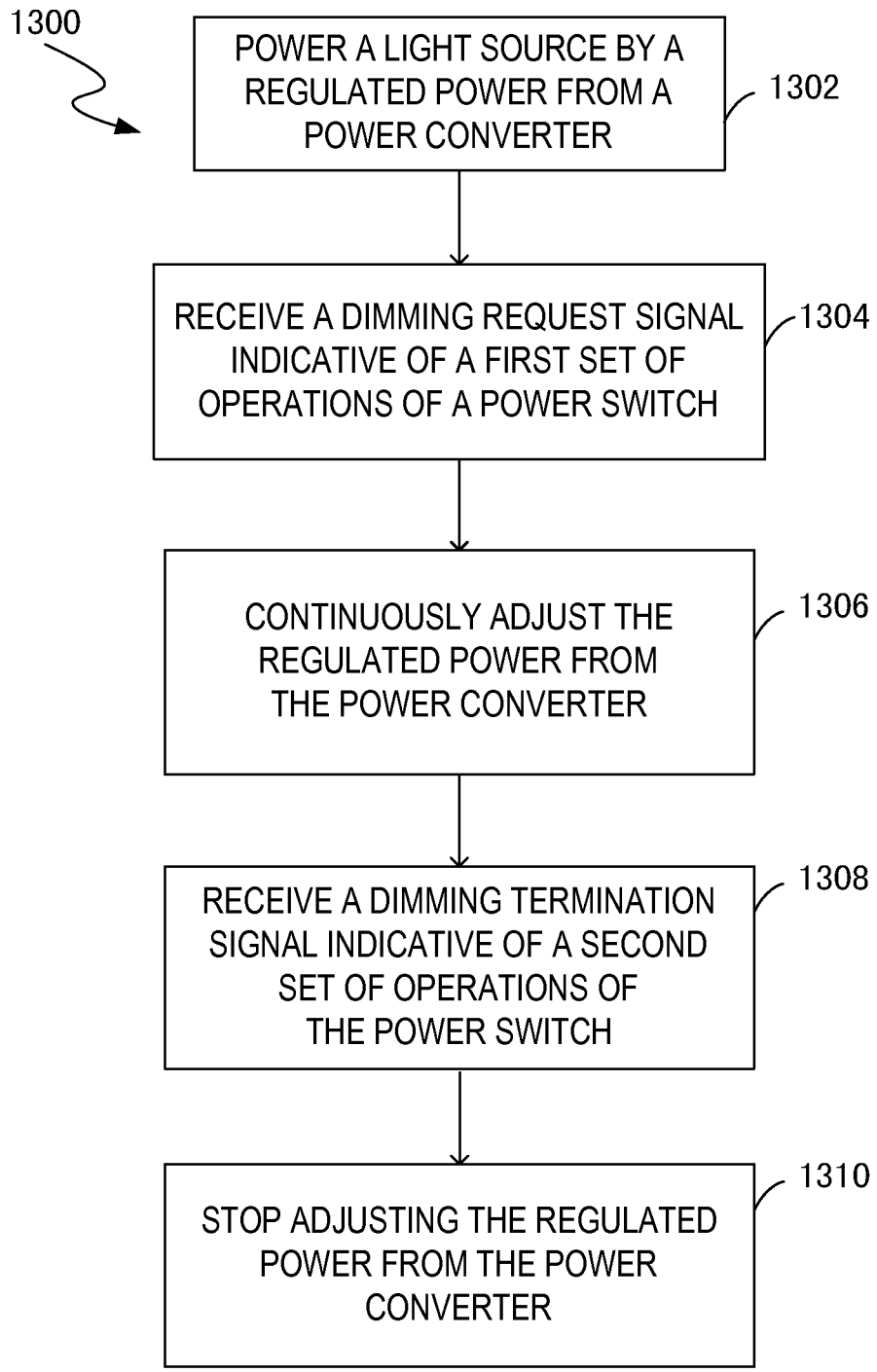
FIG. 13 shows a flowchart of a method for adjusting power of a light source, in accordance with one embodiment of the present invention.

FIG. 13 shows a flowchart 1300 of a method for adjusting power of a light source, in accordance with one embodiment of the present invention. FIG. 13 is described in combination with FIG. 10 and FIG. 11.

In block 1302, a light source, e.g., the LED string 312, is powered by a regulated power from a power converter, e.g., the power converter 310.

In block 1304, a dimming request signal can be received, e.g., by the dimming controller 1108. The dimming request signal can indicate a first set of operations of a power switch, e.g., the power switch 304 coupled between a power source and the power converter. In one embodiment, the first set of operations of the power switch includes a first turn-off operation followed by a first turn-on operation.

In block 1306, the regulated power from the power converter is continuously adjusted, e.g., by the dimming controller 1108. In one embodiment, a clock generator 1104 can be enabled to drive a counter 1126. A dimming signal (e.g., control signal 538 or reference signal REF) can be generated according to the counter value of the counter 1126. In an analog dimming mode, the regulated power from the power converter can be adjusted by comparing the reference signal REF with a feedback current monitoring signal which indicates a light source current of the light source. The voltage of REF can be determined by the counter value. In a burst dimming mode, the regulated power from the power converter can be adjusted by varying a duty cycle of a PWM signal PWM1 by the control signal 538. The duty cycle of PWM1 can be also determined by the counter value.

In block 1308, a dimming termination signal can be received, e.g., by the dimming controller 1108. The dimming termination signal can indicate a second set of operations of a power switch, e.g., the power switch 304 coupled between a power source and the power converter. In one embodiment, the second set of operations of the power switch includes a second turn-off operation followed by a second turn-on operation.

In block 1310, the adjustment of the regulated power from the power converter is terminated if the dimming termination signal is received. In one embodiment, the clock generator 1104 is disabled such that the counter 1126 can hold its counter value. As a result, in the analog dimming mode, the voltage of REF can be held at a desired level. In the burst dimming mode, the duty cycle of the PWM signal PWM1 can be held at a desired value. Consequently, the light source can maintain a desired light output.

Accordingly, embodiments in accordance with the present invention provide a light source driving circuit that can automatically and continuously adjust power of a light source if a dimming request signal is received. The light source driving circuit can stop adjusting power of the light source if a dimming termination signal is received. Advantageously, a user can enable a light/brightness adjustment by applying a first set of operations to a power switch, e.g., an on/off switch mounted on the wall. During the light adjustment process, the light output of the light source gradually decreases or increases. If a desired light output has been achieved, the user can terminate the light adjustment by applying a second set of operations to the power switch. Therefore, extra apparatus for dimming, such as an external dimmer or a specially designed switch with adjusting buttons, can be avoided and the cost can be reduced.

Figure 14A:
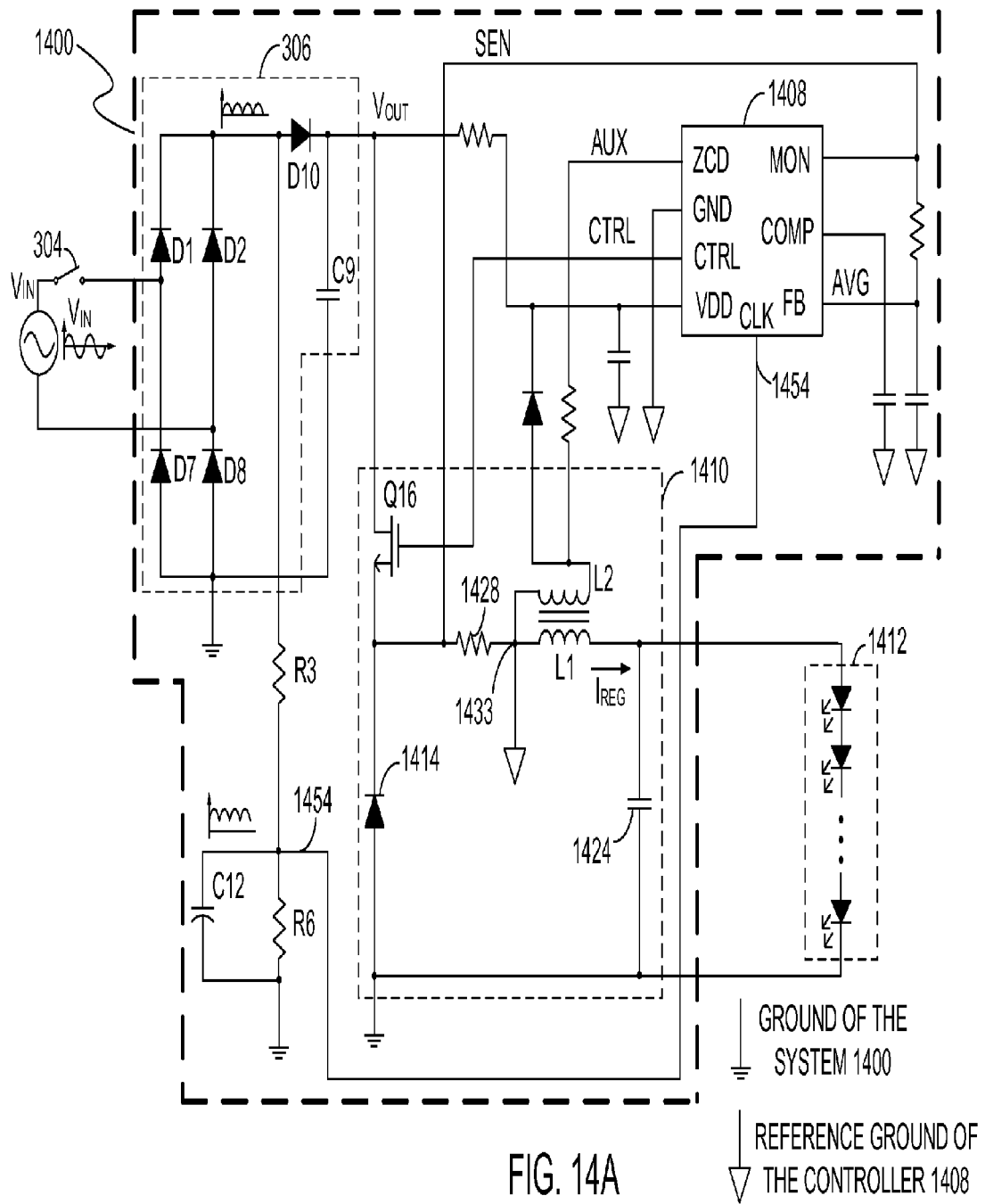
FIG. 14A shows a schematic diagram of an example of an LED light source driving system, in accordance with one embodiment of the present invention.

FIG. 14A shows a schematic diagram of an example of an LED light source driving system 1400, in accordance with one embodiment of the present invention. FIG. 14A is described in combination with FIG. 10. Elements labeled the same as in FIG. 10 have similar functions.

Figure 14B:
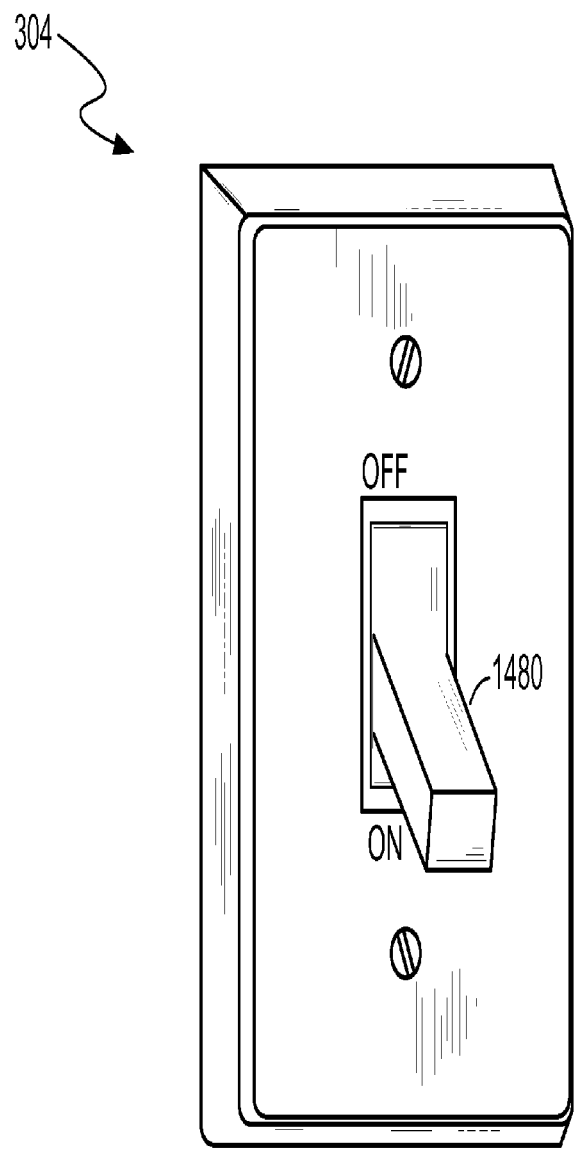
FIG. 14B shows an example of a power switch in FIG. 14A, in accordance with one embodiment of the present invention.

In one embodiment, the driving system 1400 receives AC power through the power switch 304 and generates regulated power to an LED light source. The power switch 304 can be an on/off switch mounted on the wall. An example of the power switch 304 is illustrated in FIG. 14B. By switching an element 1480 to an ON place or an OFF place, the conductance status of the power switch 1404 is controlled on or off, e.g., by a user. In the example of FIG. 14A, the driving system 1400 includes power conversion circuitry, e.g., the AC/DC converter 306 and a DC/DC converter 1410, and dimming control circuitry, e.g., a dimming controller 1408. The power conversion circuitry receives an AC signal, e.g., the AC input voltage $V_{IN}$ provided by the AC power source, through the power switch 304 and provides the regulated power, e.g., a regulated current $I_{REG}$, to an LED light source 1412. In the example of FIG. 14A, the LED light source 1412 includes an LED string. More specifically, the AC/DC converter 306 of the conversion circuitry receives AC power (e.g., the AC input voltage $V_{IN}$) and converts the AC power to DC power (e.g., the DC output voltage $V_{OUT}$). The DC/DC converter 1410 of the conversion circuitry converts the DC power (e.g., the DC output voltage $V_{OUT}$) to the regulated power (e.g., the regulated current $I_{REG}$) by controlling a control switch Q16, e.g., coupled in series with the LED light source via the DC/DC converter 1410, according to a dimming signal (not shown in FIG. 14A). The dimming controller 1408 generates the dimming signal and controls dimming of the LED light source 1412 according to the dimming signal. The dimming controller 1408 generates the dimming signal according to a set of operations of the power switch 304 and adjusts the dimming signal by counting the waves, e.g., sinusoidal full-waves or sinusoidal half-waves, or periodic cycles of the AC signal $V_{IN}$. For illustrative purposes, the AC signal $V_{IN}$ is a sinusoidal signal. However, the invention is not limited to sinusoidal AC signals.

By way of example, the full-bridge circuit of the AC/DC converter 306, e.g., including the diodes D1, D2, D7 and D8, receives the AC input voltage $V_{IN}$ from the AC power source and generates sinusoidal half-waves, e.g., having one polarity, to the filter capacitor C9. The filter capacitor C9 can therefore provide the DC output voltage $V_{OUT}$ to the DC/DC converter 1410. The resistor divider including the resistors R3 and R6 can provide a dimming request or dimming termination signal indicative of a set of operations of the power switch 304. Similar to the operations of the power switch 304 described in relation to FIG. 10, the operations of the power switch 304 in FIG. 14A includes turning off the power switch 304 followed by turning on the power switch 304 within a predefined time interval ΔT, e.g., 2 seconds. In response to the dimming request signal, the diming controller 1408 can enable a dimming process of the LED light source 1412. In response to the dimming termination signal, the dimming controller 1408, terminates the dimming process. In addition, when the power switch 304 is on, the resistor divider provides a periodic signal 1454 indicative of the sinusoidal half-waves of the AC signal $V_{IN}$ to the dimming controller 1408.

In the example of FIG. 14A, the power converter 1410 is a buck converter including the control switch Q16, a diode 1414, a current sensor 1428 (e.g., a resistor), coupled inductors L1 and L2, and a capacitor 1424. In one embodiment, the control switch Q16 may be integrated in the dimming controller 1408. The inductors L1 and L2 are magnetically coupled and electrically coupled together, e.g., to a common node 1433. Although the common node 1433 in FIG. 14A is between the resistor 1428 and the inductor L1, the common node 1433 can also locate between the control switch Q16 and the resistor 1428, in another embodiment. The common node 1433 provides a reference ground for the dimming controller 1408. The reference ground of the dimming controller 1408 is different from the ground of the driving system 1400, in one embodiment. By turning the control switch Q16 on and off, the regulated current $I_{REG}$ flowing through the inductor L1 can be adjusted, thereby adjusting the power provided to the LED light source 1412. The capacitor 1424 absorbs the ripples of the regulated current $I_{REG}$, such that the current flowing through the LED light source 1412 is smoothened and substantially equal to the average of the regulated current $I_{REG}$. In addition, the inductor L2 senses an electrical condition of the inductor L1, for example, whether the current flowing through the inductor L1 decreases to a predetermined minimum level. The inductor L2 further generates a detection signal AUX indicative of the electrical condition of the inductor L1. The resistor 1428 has one end coupled to a node between the switch Q16 and the cathode of the diode 1414, and the other end coupled to the reference ground. The resistor 1428 provides a current monitoring signal SEN indicating the regulated current $I_{REG}$ flowing through the inductor L1.

In the example of FIG. 14A, the dimming controller 1408 has terminals CLK, ZCD, GND, CTRL, VDD, MON, COMP and FB. The terminal ZCD is coupled to the inductor L2 and receives the detection signal AUX. The terminal MON is coupled to the resistor 1428 and receives the monitoring signal SEN. The terminal COMP is coupled to the reference ground of the dimming controller 1408 through a capacitor and provides a compensating voltage REF2 to the dimming controller 1408. The terminal FB receives a monitoring signal AVG indicative of the average of the current $I_{REG}$ flowing through the inductor L1. The terminal CLK monitors the power switch 304, e.g., whether the power switch 304 is on or off. When the power switch 304 is on, the terminal CLK, in the example of FIG. 14A, further receives the periodic signal 1454 indicative of sinusoidal waves of the AC signal $V_{IN}$. In another embodiment, the dimming controller 1408 includes different terminals to respectively monitor the power switch 304 and receive the periodic signal 1454. The control terminal CTRL is coupled to the control switch Q16 and generates a driving signal CTRL, e.g., a PWM signal, to control the control switch Q16, thereby controlling the dimming of the LED light source 1412. The driving signal CTRL is generated based on the operations of the power switch 304, and based on the periodic signal 1454, the detection signal AUX, and the monitoring signals SEN and AVG. In addition, the terminal VDD can receive power from the AC/DC converter 306 or the inductor L2. The terminal GND is coupled to the reference ground of the dimming controller 1408.

More specifically, in one embodiment, the power switch 304 is turned on. In operation, when the switch Q16 is on, a current $I_{REG}$ flows through the switch Q16, the resistor 1428, the inductor L1, the LED light source 1412 to the ground of the driving system 1400, and the current $I_{REG}$ increases. When the switch Q16 is off, the current $I_{REG}$ continues to flow through the resistor 1428, the inductor L1, the LED light source 1412 and the diode 1414, and the current $I_{REG}$ decreases. In one embodiment, if the monitoring signal SEN indicates that the current $I_{REG}$ increases to a maximum level $I_{MAX}$, the dimming controller 1408 turns off the switch Q16 to decrease the current $I_{REG}$. If the detection signal AUX indicates that the current $I_{REG}$ decreases to a predetermined minimum level, the dimming controller 1408 turns on the switch Q16 to increase the current $I_{REG}$. Thus, the current $I_{REG}$ is adjusted in a range from the predetermined minimum level to the maximum level $I_{MAX}$. In one embodiment, the maximum level $I_{MAX}$ is adjustable. For example, if the monitoring signal AVG indicates that the average of the current $I_{REG}$ is less than a preset level, the dimming controller 1408 increases the maximum level $I_{MAX}$ to increase the average of the current $I_{REG}$. If the monitoring signal AVG indicates that the average of the current $I_{REG}$ is greater than the preset level, the dimming controller 1408 decreases the maximum level $I_{MAX}$ to decrease the average of the current $I_{REG}$. Therefore, the current flowing through the LED light source 1412 is adjusted to the preset level. In other words, the light output of the LED light source 1412 is adjusted to a corresponding preset level.

Furthermore, in one embodiment, a user can control the power switch 304 to control the dimming of the LED light source 1412, e.g., to control the preset level for the light output. More specifically, a user can apply a set of operations on the power switch 304. The dimming controller 1408 generates the driving signal CTRL according to the operations of the power switch 304. By way of example, when the user first turns on the power switch 304, the dimming controller 1408 generates the driving signal CTRL independent from a dimming signal, e.g., a reference REF or a PWM signal PWM1, and controls the light output of the LED light source 1412 to a predetermined level, e.g., a maximum level. Then, if the user turns off the power switch 304 and then turns on the power switch 304 within a predefined time interval ΔT, the dimming controller 1408 generates the dimming signal to control the driving signal CTRL. The dimming controller 1408 further adjusts the dimming signal and the driving signal CTRL by counting the waves of the AC signal $V_{IN}$ to control the dimming of the LED light source 1412, e.g., to adjust the regulated current $I_{REG}$. In one embodiment, the dimming controller 1408 counts the half-waves of the AC signal $V_{IN}$ by counting cycles of the periodic signal 1454. In another embodiment, the dimming controller 1408 can receive the AC signal $V_{IN}$ directly or indirectly, and count the half-waves or full-waves of the AC signal $V_{IN}$.

Figure 15:
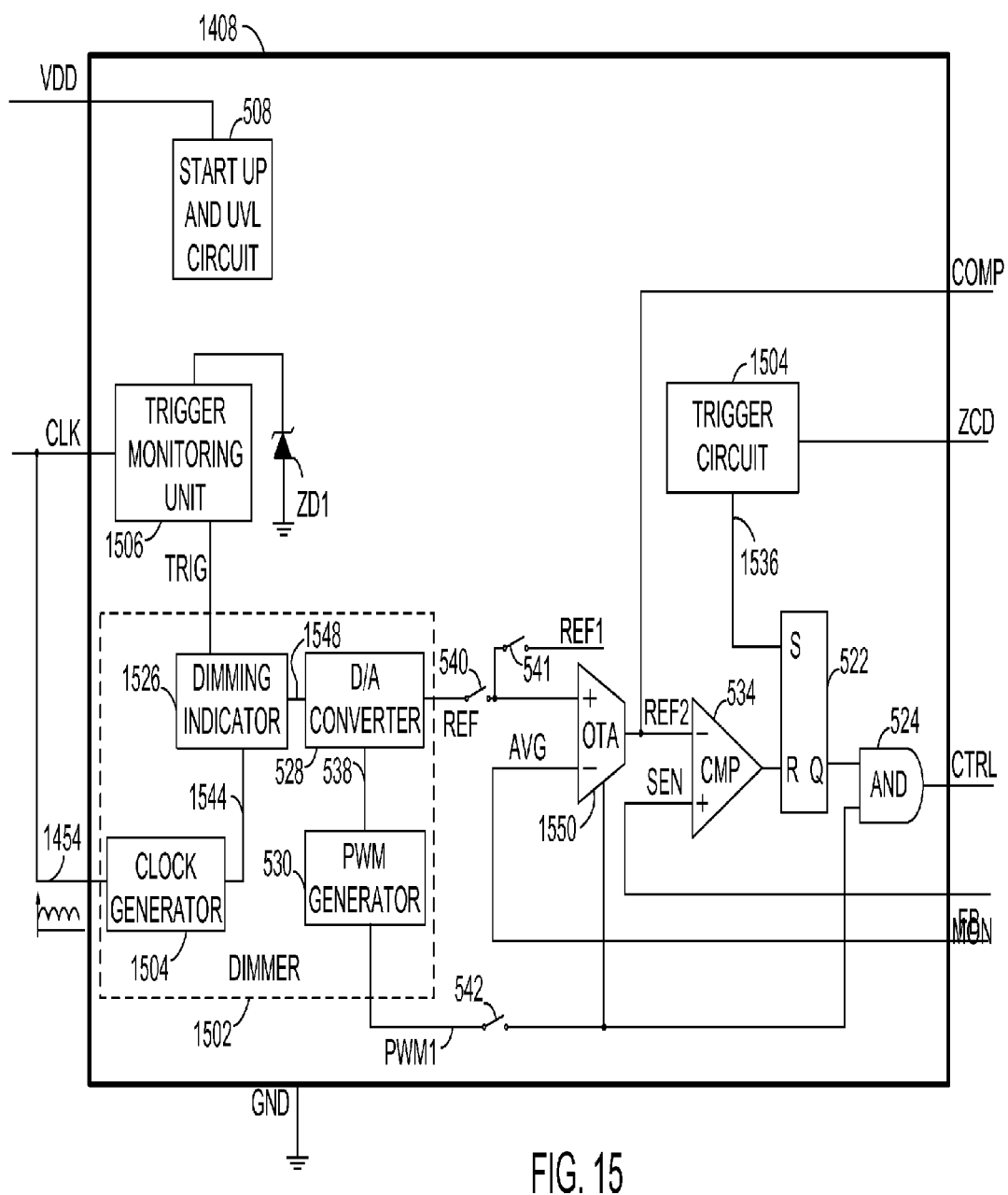
FIG. 15 shows a structure diagram of an example of a dimming controller in FIG. 14A, in accordance with one embodiment of the present invention.

FIG. 15 shows an example of a structure of the dimming control circuitry 1408 in FIG. 14A, in accordance with one embodiment of the present invention. FIG. 15 is described in combination with FIG. 10 and FIG. 14A. Elements labeled the same as in FIG. 10 and FIG. 14A have similar functions. As shown in FIG. 15, the dimming control circuitry 1408 includes a trigger monitoring unit 1506, a dimmer 1502, and driving signal generator circuitry that includes an error amplifier 1550, the comparator 534, the SR flip-flop 522, the AND gate 524, and a trigger circuit 1504.

The trigger monitoring unit 1506 can monitor the operations of the power switch 304 via the terminal CLK and generate a pulse TRIG in response to a detection of a set of operations of the power switch 304. In one embodiment, the operations includes turning off the power switch 304 followed by turning on the power switch 304 within a predefined time interval ΔT. If such operations is performed, the trigger monitoring unit 1506 can detect a negative edge of the voltage at the terminal CLK followed by a positive edge. The dimmer 1502 can count the waves of the AC signal $V_{IN}$, e.g., by counting the periodic signal 1454, based on the pulse TRIG. For example, the trigger monitoring unit 1506 can generate a pulse TRIG to enable or disable the counting of the periodic signal 1454.

The dimmer 1502 includes the D/A converter 528 and the PWM generator 530, and further includes a dimming indicator 1526 and a clock generator 1504. In one embodiment, the clock generator 1504 receives the periodic signal 1454 and generates a clock signal 1544 indicative of the periodic signal 1454. For example, the clock generator 1504 can generate one pulse in each cycle of the periodic signal 1454. The dimming indicator 1526 counts the waves of the AC signal $V_{IN}$ by counting the pulses of the clock signal 1544. The dimming indicator 1526 further generates a digital output 1548 indicating a dimming value according to the result of the counting, in one embodiment. By way of example, if the result of the counting exceeds a predetermined number, the dimming indicator 1526 increases the dimming value of the digital output 1548 by one and restarts the counting. The D/A converter 538 can increase the dimming signal, e.g., the reference signal REF or the duty cycle of the PWM signal PWM1, if the digital output 1548 increases, and decrease the dimming signal if the digital output 1548 decreases. Thus, the dimmer 1502 can adjust the dimming signal by counting the waves of the AC signal $V_{IN}$ to adjust the driving signal CTRL.

The trigger circuit 1504 is coupled to the terminal ZCD of the dimming control circuitry 1408. In one embodiment, if the terminal ZCD detects that the regulated current $I_{REG}$ decreases to a predetermined minimum level, e.g., zero amperes, the trigger circuit 1504 generates a pulse signal 1536, e.g., a logic-high signal, to set the Q output of the flip-flop 522 to be logic high and to turn on the switch Q16. Moreover, if the current monitoring signal SEN received at the terminal MON of the dimming control circuitry 1408 increases to an adjustable maximum level, e.g., the compensating voltage REF2, the comparator 534 outputs a logic-high signal to reset the Q output of the flip-flop 522 to logic low to turn off the switch Q16. Thus, the regulated current $I_{REG}$ can be adjusted in a range between the predetermined minimum level, e.g., zero amperes, and a maximum level determined by the compensating voltage REF2.

In an analog dimming mode, the dimming controller 1408 controls the dimming of the LED light source 1412 by comparing the reference signal REF with the monitoring signal AVG indicative of the current flowing through the LED light source 1412. More specifically, the error amplifier 1550 compares the reference signal REF with the monitoring signal AVG. The error amplifier 1550 further increases the compensating voltage REF2 if the monitoring signal AVG is less than the reference signal REF, or decreases the compensating voltage REF2 if the monitoring signal AVG is greater than the reference signal REF, in one embodiment. Thus, the current through the LED light source 1412 is adjusted to a level determined by the reference signal REF. Accordingly, the light output of the LED light source 1412 is adjusted by the reference signal REF. In a burst dimming mode, the dimming controller 1408 controls the dimming of the LED light source 1412 according to the PWM signal PWM1 and the Q output, e.g., a PWM signal, of the flip-flop 522. More specifically, when the PWM signal PWM1 is logic high, the regulated current $I_{REG}$ is adjusted by the Q output and the average of the regulated current $I_{REG}$ is determined by the reference signal REF1. When the PWM signal PWM1 is logic low, the regulated current $I_{REG}$ is cut off. Thus, the light output of the LED light source 1412 can increase if the duty cycle of the PWM signal PWM1 increases, or decrease if the duty cycle of the PWM signal PWM1 decreases.

Figure 16:
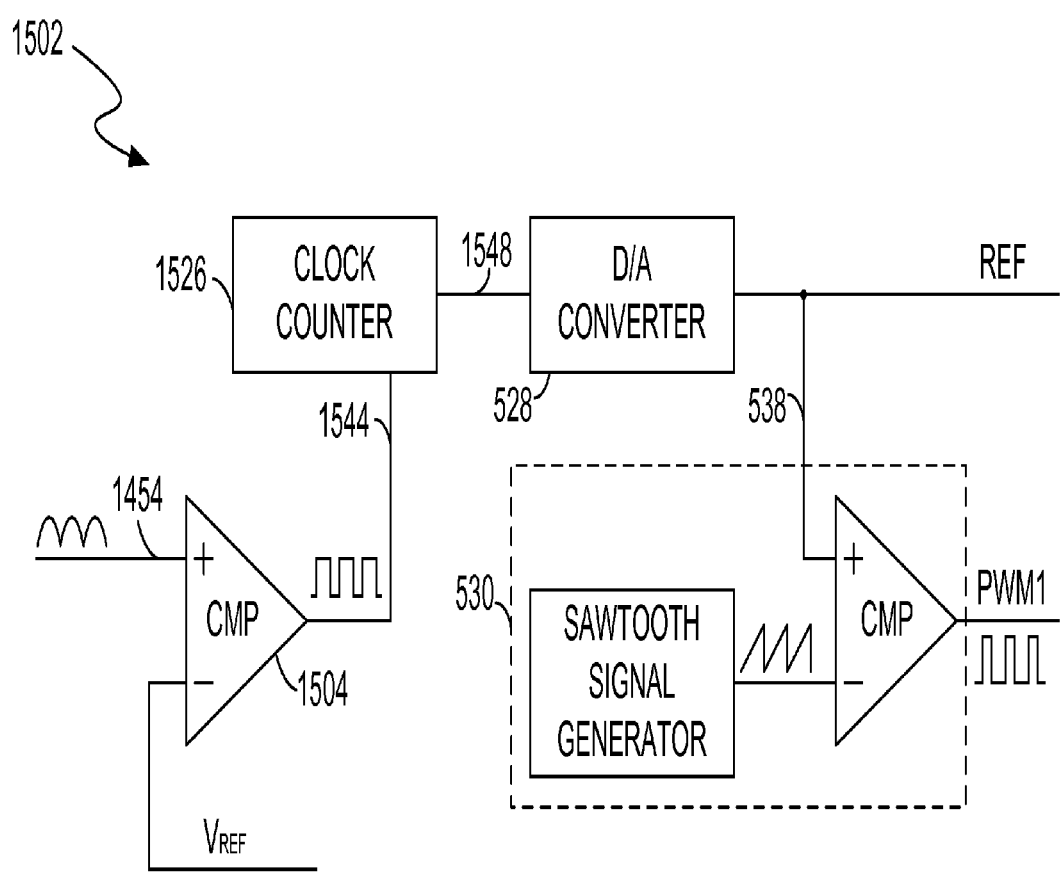
FIG. 16 shows a structure diagram of an example of a dimmer in FIG. 15, in accordance with one embodiment of the present invention.

An example of a structure of the dimmer 1502 in FIG. 15 is illustrated in FIG. 16, in accordance with one embodiment of the present invention. FIG. 16 is described in combination with FIG. 15. In the example of FIG. 16, the clock generator 1504 includes a comparator and the dimming indicator 1526 includes a clock counter. The PWM generator 530 includes a sawtooth signal generator and a comparator. The clock generator 1504 compares the periodic signal 1454 indicative of the AC signal $V_{IN}$ with a voltage reference $V_{REF}$ to generator the clock signal 1544. Each pulse of the clock signal 1544 corresponds to a cycle of the periodic signal 1454, in one embodiment. By way of example, if the frequency of the AC signal $V_{IN}$ is 50 Hz, the frequency of the periodic signal 1454 is 100 Hz and the frequency of the clock signal 1544 is also 100 Hz. In one embodiment, if a result of the counting of the waves of the AC signal $V_{IN}$ exceeds a predetermined number, e.g., 100, the dimming indicator 1526 increases the dimming value of the digital output 1548 by a predetermined number (e.g., by one) and restarts the counting. The D/A converter 528 therefore can control the dimming signal, e.g., the reference signal REF or the duty cycle of the PWM signal PWM1, from a first preset level to a second preset level. In such example, the dimming value can increase by one for each 1 second, and thus the light output of the LED light source 1412 can also increase by a predetermined amount for each 1 second.

Returning to FIG. 15 which is described in combination with FIG. 16, in operation, when a user first turns on the power switch 304, the dimming indicator 1526 can set the digital output 1548 to a predetermined dimming value, e.g., a maximum dimming value. By way of example, in the analog dimming mode, the reference signal REF is preset to a maximum level, e.g., equal to the reference signal REF1. In another example, in the burst dimming mode, the duty cycle of the PWM signal PWM1 is preset to 100%. Accordingly, the LED light source 1412 in FIG. 14A can emit a maximum light intensity/brightness.

If the user turns off the power switch 304 and then turns on the power switch 304 within the predefined time interval ΔT, the trigger monitoring unit 1506 detects a negative edge of the voltage at the terminal CLK followed by a positive edge. Therefore, the trigger monitoring unit 1506 generates a first pulse based on the operations of the power switch 304. The first pulse can enable the counting of the waves of the AC signal $V_{IN}$ to adjust the dimming signal, e.g., the reference signal REF or the PWM signal PWM1. In one embodiment, in response to the first pulse, the dimming indicator 1526 increases the digital output 1548 from a minimum dimming value, and the light output of the LED light source 1412 increases from a corresponding minimum intensity/brightness. When the dimming signal is adjusted to a desired level, e.g., the light output of the LED light source 1412 is adjusted to a desired intensity/brightness, the user can turn off the power switch 304 and then turn on the power switch 304 within the predefined time interval ΔT. Accordingly, the trigger monitoring unit 1506 generates a second pulse based on the operations of the power switch 304. The second pulse can disable the counting of the waves of the AC signal $V_{IN}$. Therefore, the dimming indicator 1526 maintains the dimming signal at the desired level to maintain the light output of the LED light source 1412 at the desired intensity/brightness.

Furthermore, if the user turns off the power switch 304 and then turns on the power switch 304 within the predefined time interval ΔT again, the dimming indicator 1526 can restart the counting of the clock signal 1544 and increase the digital output 1548 from the minimum dimming value again. However, in one embodiment, if the digital output 1548 reaches the maximum dimming value, the dimming indicator 1526 can stop counting the clock signal 1544 and maintain the digital output 1548 to the maximum dimming value. Thus, the light output of the LED light source 1412 remains at the maximum intensity/brightness. Then, if the user turns off the power switch 304 and then turns on the power switch 304 within the predefined time interval ΔT again, the trigger monitoring unit 1506 can enable the dimming indicator 1526 to restart the counting of the clock signal 1544. The dimming indicator 1526 can increase the digital signal 1548 from the minimum dimming value again.

Figure 17:
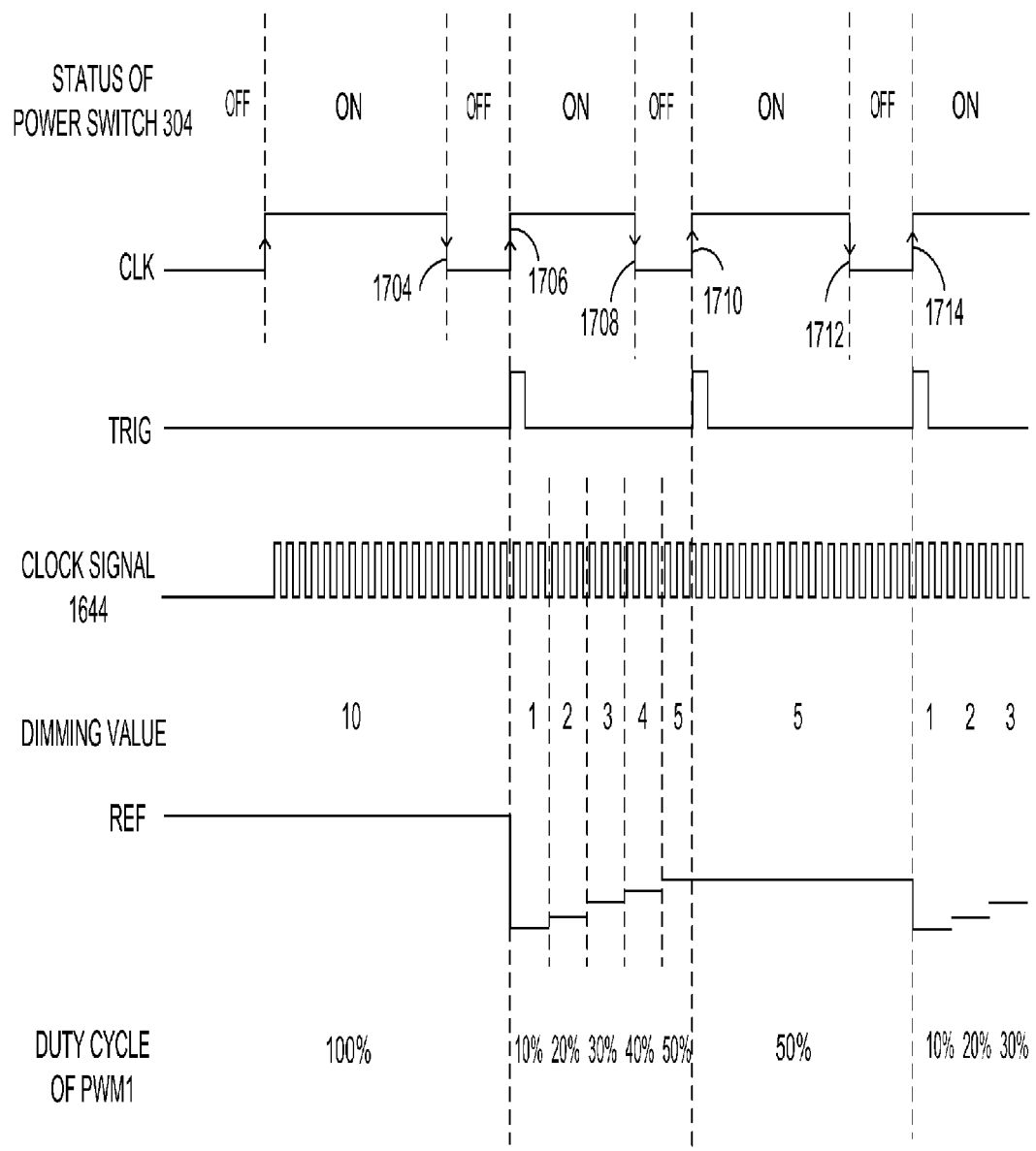
FIG. 17 illustrates an example of a diagram illustrating an operation of an LED light source driving system, in accordance with one embodiment of the present invention.

FIG. 17 illustrates an example of a diagram illustrating an operation of the light source driving system 1400 in FIG. 14A, in accordance with one embodiment of the present invention. FIG. 17 is described in combination with FIG. 14A, FIG. 15 and FIG. 16.

Assume that initially the power switch 304 is off. In operation, when the power switch 304 is initially turned on, e.g., by a user, the LED light source 1412 is powered by regulated power from the power converter 1410 to generate an initial light output, in one embodiment. In the analog dimming mode, the initial light output can be determined by an initial voltage of the reference signal REF. In the burst dimming mode, the initial light output can be determined by an initial duty cycle (e.g., 100%) of the PWM signal PWM1. The reference signal REF and the PWM signal PWM1 can be generated according to the dimming value of the dimming indicator 1526. Therefore, the initial voltage of REF and the initial duty cycle of PWM1 can be determined by an initial dimming value (e.g., 10) provided by the dimming indicator 1526.

In order to adjust the light output of the LED light source 1412, the user can apply a first set of operations to the power switch 304. A dimming request signal is generated upon detection of a first turn-off operation followed by a first turn-on operation of the power switch 304 within a predefined time interval ΔT. As a result, a dimming request signal including a negative edge 1704 followed by a positive edge 1706 of the voltage at the terminal CLK can be detected. In response to the dimming request signal, the trigger monitoring unit 1506 can generate a pulse TRIG. Thus, the dimming indicator 1526 is enabled to count the clock signal 1544. In the example of FIG. 17, the dimming indicator 1526 increases the dimming value from a minimum value, e.g., 1, and increases the dimming value by one in response to three pulses of the clock signal 1544. However, the invention is not so limited. In another embodiment, the dimming indicator 1526 can increase the dimming value by two, three, or other number, in response to a predetermined number of the pulses of the clock signal 1544. In yet another embodiment, the dimming indicator 1526 can decrease the dimming value from a predetermined value, e.g., 10, and decreases the dimming value by one, two, or other number, in response to a predetermined number of the pulses of the clock signal 1544.

In the analog dimming mode, the D/A converter 528 reads the dimming value from the dimming indicator 1526 and increases the voltage of the reference signal REF in response to an increase of the dimming value, in one embodiment. In the burst dimming mode, the D/A converter 528 reads the dimming value from the dimming indicator 1526 and increases the duty cycle of the PWM signal PWM1 (e.g., increases 10% each time) in response to an increase of the dimming value, in one embodiment. Accordingly, the light output of the LED light source 1412 is adjusted.

Once a desired light output has been achieved before the dimming value reaches the maximum value, e.g., 10, the user can terminate the adjustment process by applying a second set of operations to the power switch 304. A dimming termination signal is generated upon detection of a second turn-off operation followed by a second turn-on operation of the power switch 304 within a predefined time interval $\Delta T$. As a result, the dimming termination signal including a negative edge 1708 followed by a positive edge 1710 of the voltage at the terminal CLK can be detected. Upon detection of the dimming termination signal, the trigger monitoring unit 1506 can generate a pulse TRIG. Thus, the dimming indicator 1526 is disabled and holds its dimming value. Accordingly, in the analog dimming mode, the voltage of the reference signal REF can be held at a desired level. In the burst dimming mode, the duty cycle of the PWM signal PWM1 can be held to a desired value. Therefore, the light output of the LED light source 1412 can be maintained at a desired level.

In order to further adjust the light output of the LED light source 1412, the user can apply a third set of operations to the power switch 304. A dimming request signal is generated upon detection of a third turn-off operation followed by a third turn-on operation of the power switch 304 within a predefined time interval $\Delta T$. As a result, a dimming request signal including a negative edge 1712 followed by a positive edge 1714 of the voltage at the terminal CLK can be detected. Accordingly, the dimming control circuitry 1408 adjusts the light output of the LED light source 1412 through adjusting the dimming levels by counting the clock signal 1544.

Figure 18:
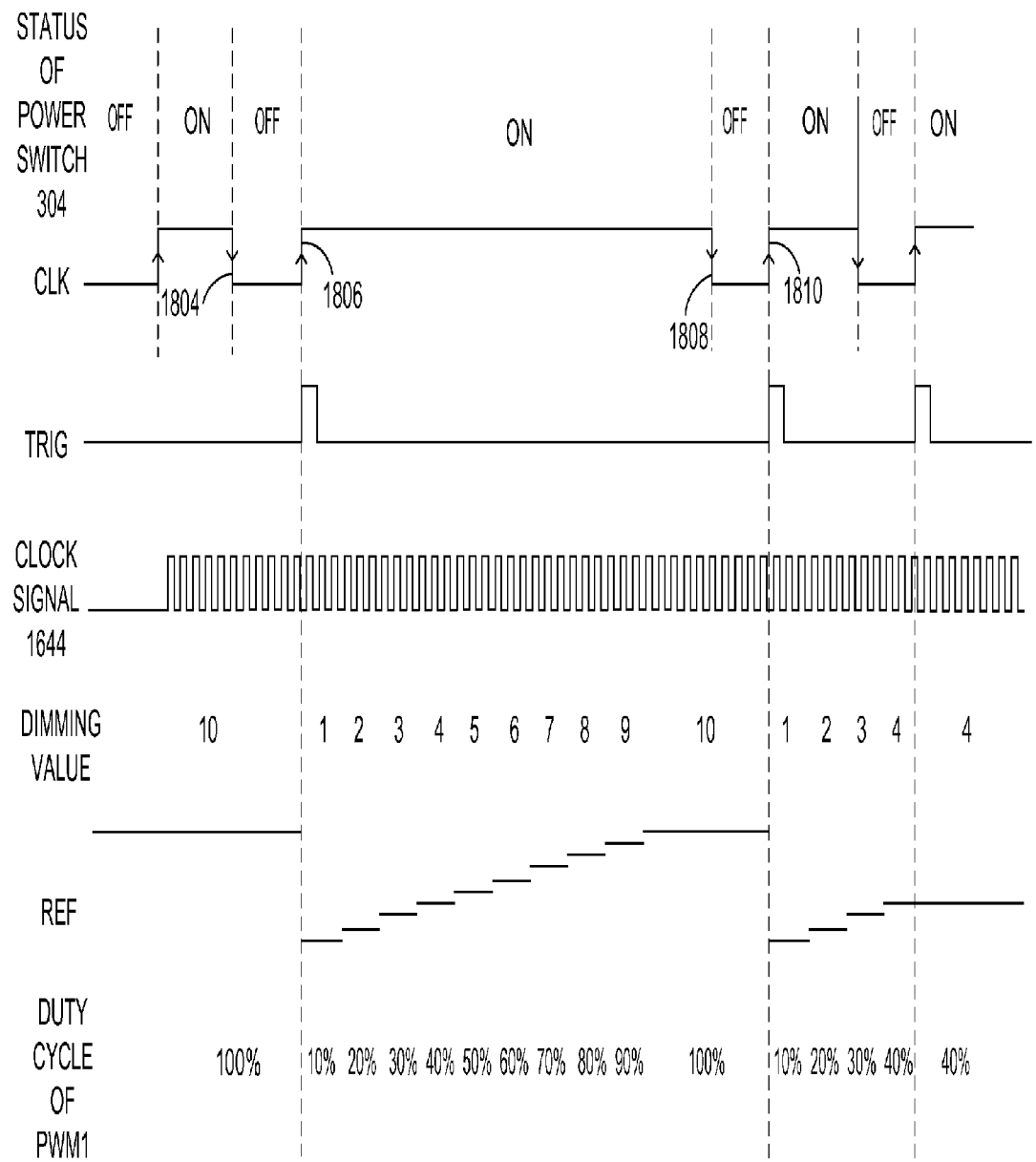
FIG. 18 illustrates an example of a diagram illustrating an operation of an LED light source driving system, in accordance with one embodiment of the present invention.

FIG. 18 illustrates an example of a diagram illustrating an operation of the light source driving system 1400 in FIG. 14A, in accordance with one embodiment of the present invention. FIG. 18 is described in combination with FIG. 14A, FIG. 15, FIG. 16 and FIG. 17.

Similar to the example of FIG. 17, in the example of FIG. 18, assume that initially the power switch 304 is off. In operation, when the power switch 304 is initially turned on, e.g., by a user, the LED light source 1412 is powered by regulated power from the power converter 1410 to generate an initial light output, in one embodiment.

In order to adjust the light output of the LED light source 1412, the user can apply a first set of operations to the power switch 304. A dimming request signal is generated upon detection of a first turn-off operation followed by a first turn-on operation within a predefined time interval $\Delta T$. As a result, a dimming request signal including a negative edge 1804 followed by a positive edge 1806 of the voltage at the terminal CLK can be detected. The dimming control circuitry 1408 adjusts the regulated power to the LED light source 1412 through adjusting dimming levels by counting the clock signal 1544.

In the example of FIG. 18, if the dimming value increases to its maximum value, e.g., 10, the dimming indicator 1526 can maintain the dimming value to its maximum value. In another embodiment, the dimming value decreases from its maximum value, e.g., 10. If the dimming value decreases to its minimum value, e.g., 1, the dimming indicator 1526 can maintain the dimming value to its minimum value. Thus, in the analog dimming mode, the voltage of the reference signal REF remains at its maximum level or its minimum level, and in the burst dimming mode, the duty cycle of the PWM signal PWM1 remains at its maximum duty cycle, e.g., 100%, or its minimum duty cycle, e.g., 10%. The light output of the LED light source 1412 remains at its maximum level or its minimum level accordingly.

The user can restart the adjustment process by applying a second set of operations to the power switch 304. A dimming request signal is generated upon detection of a second turn-off operation followed by a second turn-on operation within a predefined time interval $\Delta T$. As a result, the dimming request signal including a negative edge 1808 followed by a positive edge 1810 of the voltage at the terminal CLK can be detected, and the dimming control circuitry 1408 can adjust the regulated power to the LED light source 1412 through adjusting dimming levels by counting the clock signal 1544.

Figure 19:
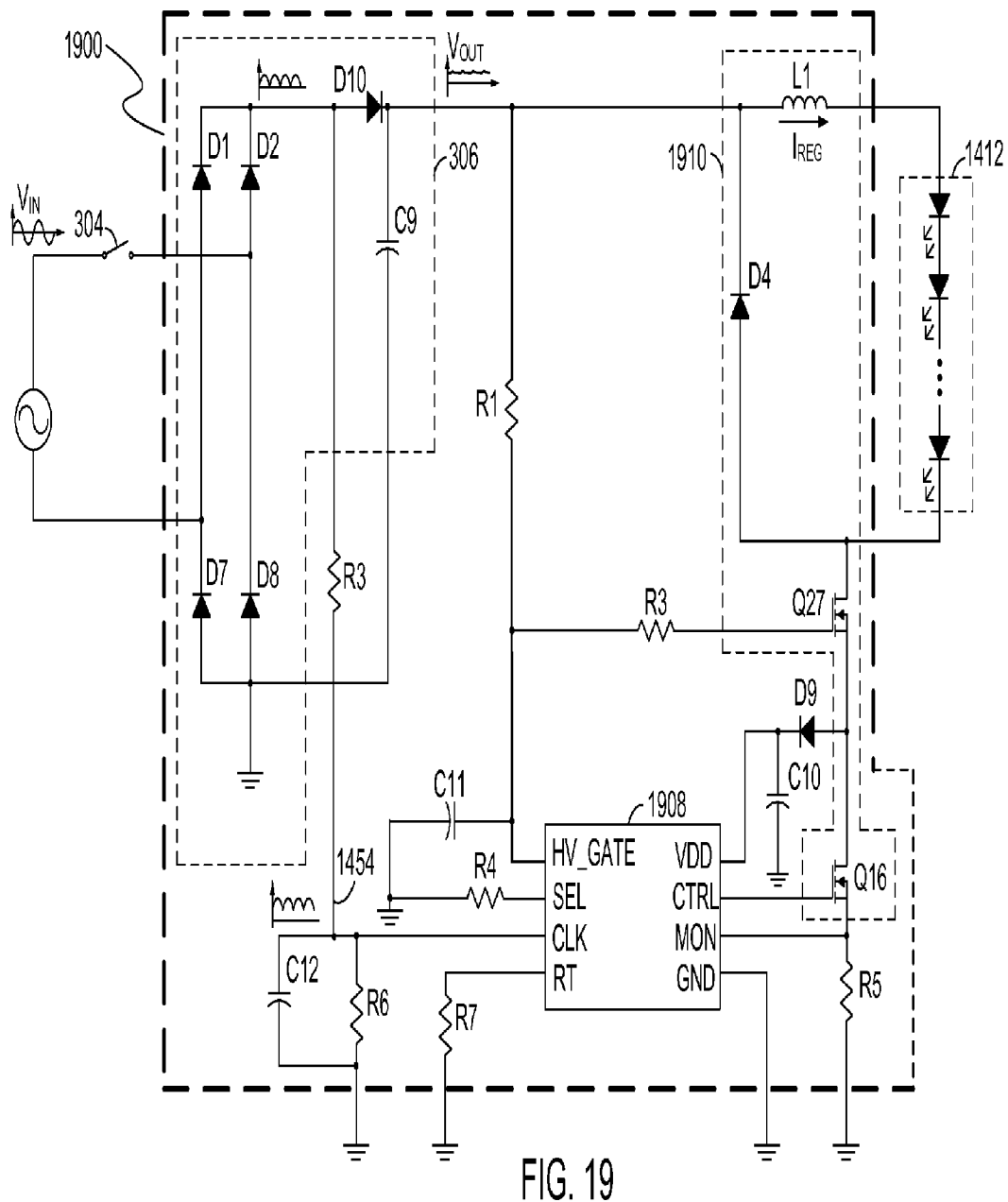
FIG. 19 shows a schematic diagram of an example of an LED light source driving system, in accordance with one embodiment of the present invention.

FIG. 19 shows an example of a schematic diagram of an LED light source driving system 1900, in accordance with one embodiment of the present invention. FIG. 19 is described in combination with FIG. 10 and FIG. 14A. Elements labeled the same as in FIG. 10 and FIG. 14A have similar functions. Similar to the driving system 1400 in FIG. 14A, the driving system 1900 includes power conversion circuitry, e.g., the AC/DC converter 306 and a DC/DC converter 1910, and dimming control circuitry, e.g., a dimming controller 1908. In the example of FIG. 19, the DC/DC converter 1910 and the dimming controller 1908 have similar functions as the DC/DC converter 310 and the dimming controller 1008 described in relation to FIG. 10. Furthermore, the dimming controller 1908 receives the periodic signal 1454, e.g., via the terminal CLK, and counts the sinusoidal waves of the AC signal $V_{IN}$ by counting the cycles of the periodic signal 1454. The dimming controller 1908 can adjust the regulated power $I_{REG}$ to the LED light source 1412 by counting the sinusoidal waves of the AC signal $V_{IN}$. The adjusting process of the regulated power $I_{REG}$ is similar to that described in relation to FIG. 14A. In one embodiment, the control switch Q16 may be integrated in the dimming controller 1908.

Figure 20:
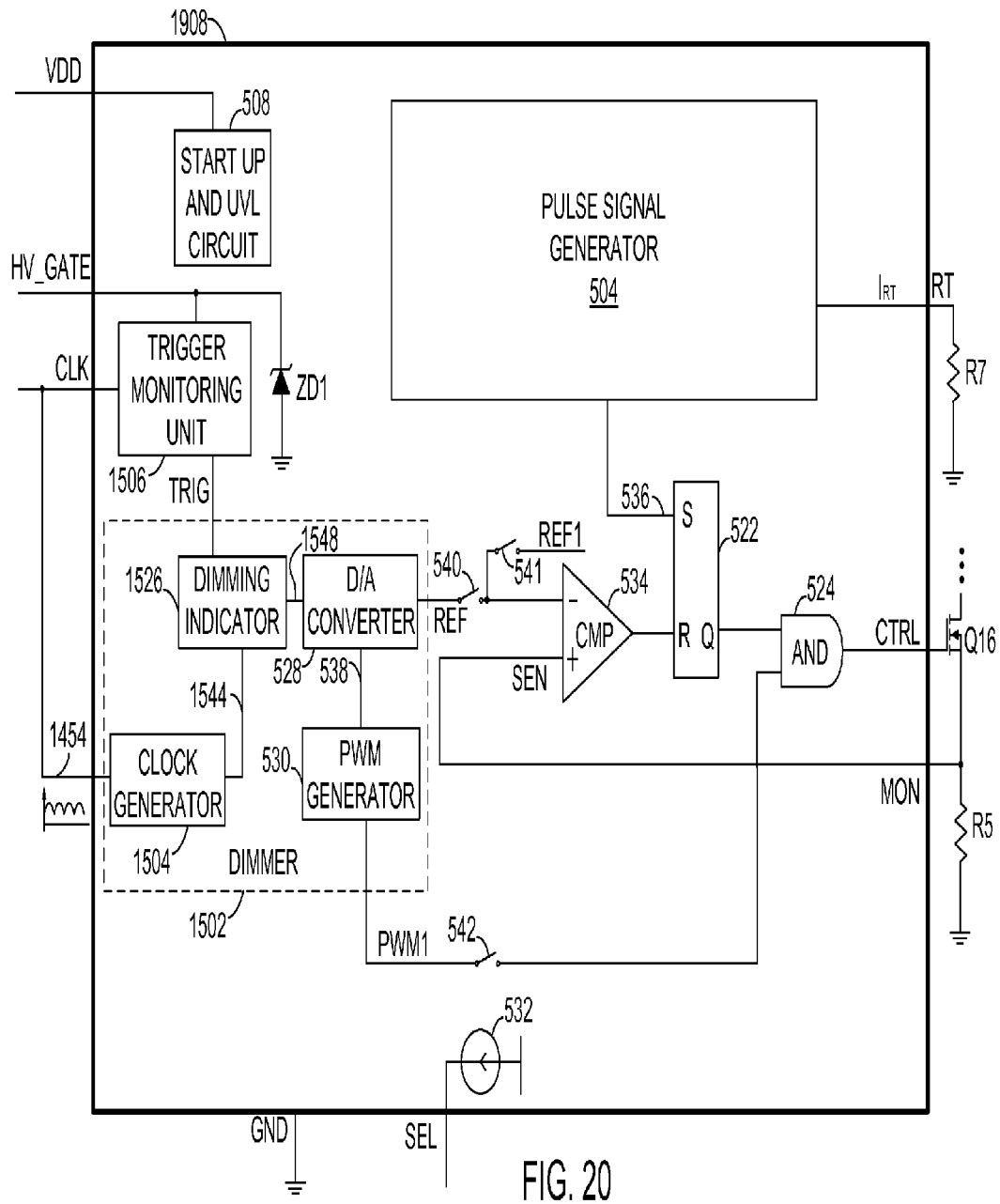
FIG. 20 shows a structure diagram of an example of a dimming controller in FIG. 19, in accordance with one embodiment of the present invention.

FIG. 20 shows an example of a structure of the dimming control circuitry 1908 in FIG. 19, in accordance with one embodiment of the present invention. FIG. 20 is described in combination with FIG. 11, FIG. 15 and FIG. 19. Elements labeled the same as in FIG. 11, FIG. 15 and FIG. 19 have similar functions.

In the example of FIG. 20, the structure of the dimming control circuitry 1908 is similar to the structure of the dimming controller 1008 in FIG. 11 except for the configuration of the trigger monitoring unit 1506 and the dimmer 1502. The trigger monitoring unit 1506 and the dimmer 1502 have similar functions as in the dimming control circuitry 1408 in FIG. 15.

Figure 21:
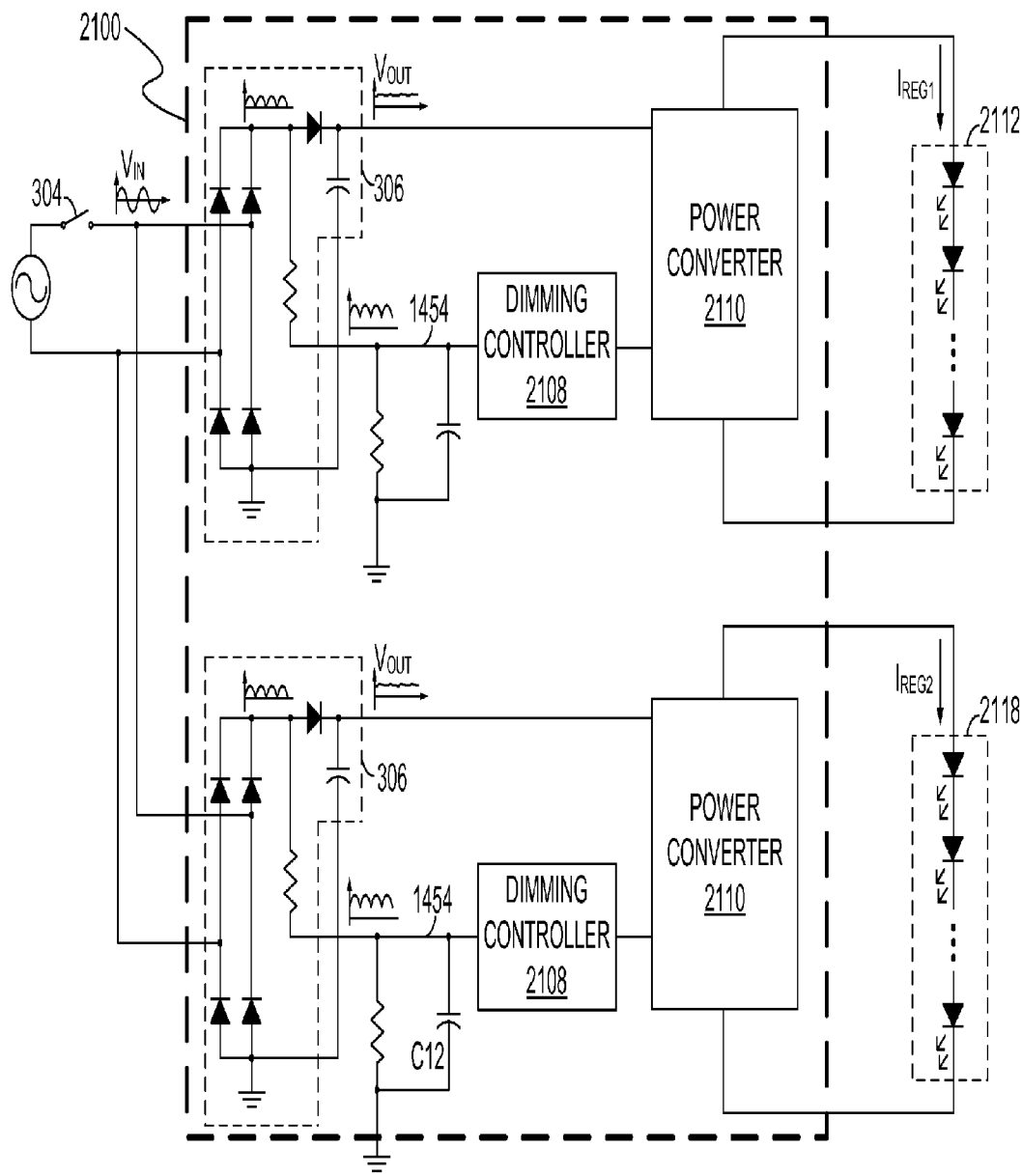
FIG. 21 shows a block diagram of an example of an LED light source driving system, in accordance with one embodiment of the present invention.

FIG. 21 shows an example of a block diagram of an LED light source driving system 2100, in accordance with one embodiment of the present invention. FIG. 21 is described in combination with FIG. 14A, FIG. 15, FIG. 19 and FIG. 20. Elements labeled the same as in FIG. 14A and FIG. 19 have similar functions.

In one embodiment, the driving system 2100 includes multiple power converters 2110 to power multiple LED sources, e.g., LED strings 2112 and 2118. The driving system 2100 further includes multiple dimming controllers 2108 to control regulated power, e.g., regulated currents $I_{REG1}$ and $I_{REG2}$, provided to the LED sources by counting the waves of the AC signal $V_{IN}$, e.g., counting the cycles of the periodic signal 1454. The power converters 2110 can have similar functions and/or structures as the power converter 1410 in FIG. 14A or the power converter 1910 in FIG. 19. The dimming controllers 2108 can have similar functions and/or structures as the dimming controller 1408 (in FIG. 14A and FIG. 15) or the dimming controller 1908 (in FIG. 19 and FIG. 20).

Although two LED strings are shown in FIG. 21, they are examples for illustrative purposes. The driving system 2100 can power other number of LEDs or LED strings. Accordingly, the driving system 2100 includes corresponding number of DC/DC converters and dimming controllers. Advantageously, by counting the waves of the AC signal $V_{IN}$ to adjust the light outputs of the multiple LED sources, the adjusting process of the light outputs of the LED sources are synchronized with each other. In other words, variation of the light outputs of the LED sources can be substantially the same. Thus, the LED sources can emit substantially the same light intensity/brightness. Additionally, internal oscillator circuits can be omitted in the dimming controllers 2108.

Figure 22:
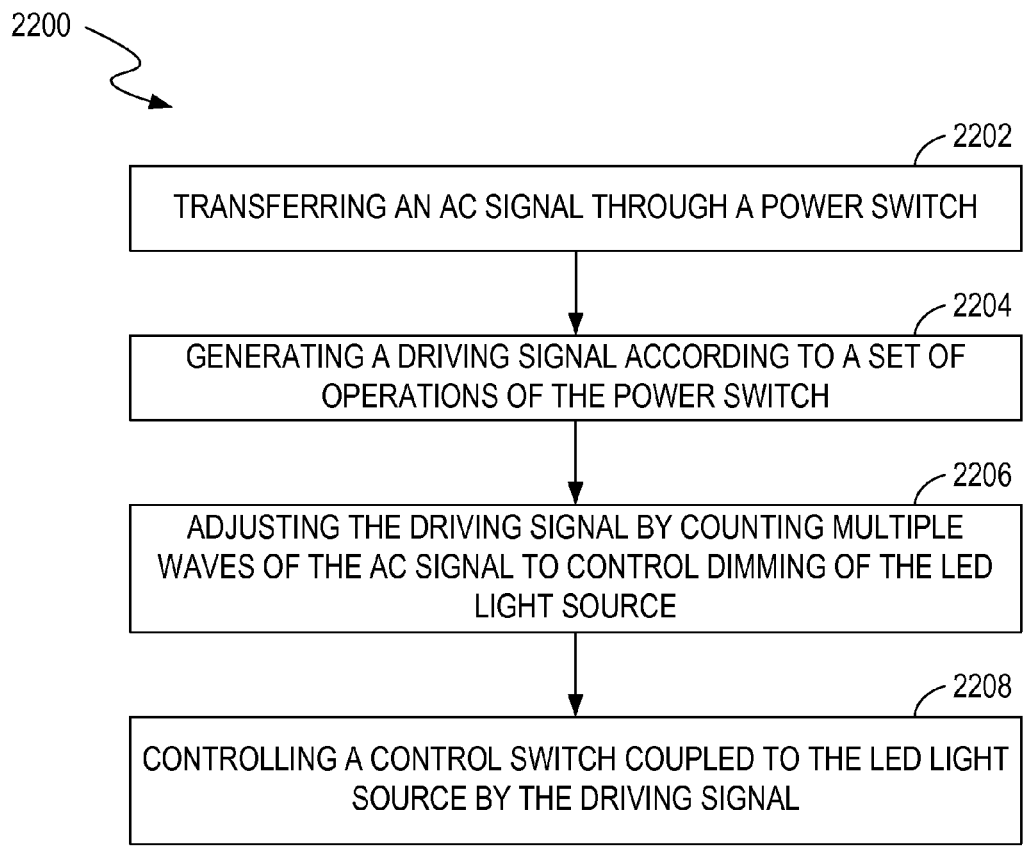
FIG. 22 shows a flowchart of an example of a method for controlling dimming of an LED light source, in accordance with one embodiment of the present invention.

FIG. 22 shows a flowchart of an example of a method for controlling dimming of an LED light source, in accordance with one embodiment of the present invention. FIG. 22 is described in combination with FIG. 14A, FIG. 15, FIG. 16, FIG. 17, FIG. 18, FIG. 19, FIG. 20 and FIG. 21.

In block 2202, an AC signal $V_{IN}$ is transferred through the power switch 304. In block 2204, a dimming controller generates a driving signal CTRL according to a set of operations of the power switch 304. In block 2206, the dimming controller adjusts the driving signal CTRL by counting the waves of the AC signal $V_{IN}$ to control the dimming of the LED light source 1412. In block 2208, the driving signal CTRL controls the control switch Q16 coupled to the LED light source 1412.

Accordingly, embodiments according to the present invention provide controllers, systems and methods for controlling dimming of LED light sources. In one embodiment, a driving system can include multiple dimming controllers to adjust the light outputs of the LED light sources respectively. Each dimming controller can count the waves, e.g., sinusoidal waves of the AC input voltage from an AC power source, and can increase or decrease the light output of a corresponding LED source by a predetermined amount in response to a predetermined number of the waves of the AC input voltage. Advantageously, the dimming of the multiple LED sources can be synchronized to each other, and the multiple LED sources can emit substantially the same light intensity/brightness.

While the foregoing description and drawings represent embodiments of the present invention, it will be understood that various additions, modifications and substitutions may be made therein without departing from the spirit and scope of the principles of the present invention as defined in the accompanying claims. One skilled in the art will appreciate that the invention may be used with many modifications of form, structure, arrangement, proportions, materials, elements, and components and otherwise, used in the practice of the invention, which are particularly adapted to specific environments and operative requirements without departing from the principles of the present invention. The presently disclosed embodiments are therefore to be considered in all respects as illustrative and not restrictive, the scope of the invention being indicated by the appended claims and their legal equivalents, and not limited to the foregoing description.

What is claimed is:

1. A controller for controlling dimming of a light-emitting diode (LED) light source, said controller comprising:
   a control terminal operable for providing a driving signal to control a control switch coupled to said LED light source, thereby controlling said dimming of said LED light source; and
   dimming control circuitry coupled to said control terminal and operable for generating said driving signal according to a plurality of operations of a power switch that transfers an alternating-current (AC) signal, said dimming control circuitry operable for counting a number of waves of said AC signal, and operable for adjusting said driving signal according to said number of said waves.

2. The controller of claim 1, wherein said AC signal comprises an AC voltage provided by an AC power source.

3. The controller of claim 1, wherein said dimming control circuitry counts said waves of said AC signal by counting pulses of a clock signal.

4. The controller of claim 3, wherein said dimming control circuitry compares a periodic signal indicative of said AC signal with a voltage reference to generate said clock signal.

5. The controller of claim 1, wherein said dimming control circuitry adjusts a dimming signal by counting said waves of said AC signal to adjust said driving signal.

6. The controller of claim 5, wherein said dimming control circuitry controls said dimming signal from a first preset level to a second preset level when said number of said waves exceeds a predetermined number.

7. The controller of claim 5, wherein said dimming control circuitry comprises:
   a trigger monitoring unit operable for monitoring said power switch and generating a pulse in response to a detection of said operations of said power switch; and
   a dimmer coupled to said trigger monitoring unit and operable for counting said waves to adjust said dimming signal based on said pulse.

8. The controller of claim 7, wherein if said trigger monitoring unit generates a first pulse based on said operations, said first pulse enables said counting of said waves to adjust said dimming signal to a level, and wherein if said trigger monitoring unit generates a second pulse based on said operations, said second pulse disables said counting of said waves to maintain said dimming signal at said level.

9. The controller of claim 5, wherein said dimming signal comprises a reference signal, and wherein said controller controls said dimming of said LED light source by comparing said reference signal with a monitoring signal indicative of a current flowing through said LED light source.

10. The controller of claim 5, wherein said dimming signal comprises a pulse-width modulation (PWM) signal, and wherein said controller controls said dimming of said LED light source according to said PWM signal and a pulse signal.

11. The controller of claim 1, wherein said operations of said power switch comprise turning off said power switch followed by turning on said power switch within a predefined time interval.

12. A method for controlling dimming of a light-emitting diode (LED) light source, said method comprising:

transferring an alternating-current (AC) signal through a power switch;
generating a driving signal according to a plurality of operations of said power switch;
counting waves of said AC signal;
adjusting said driving signal according to the number of said waves obtained by said counting; and
controlling a control switch coupled to said LED light source by said driving signal to control said dimming of said LED light source.

13. The method of claim 12, wherein said adjusting of said driving signal comprises:
comparing a periodic signal indicative of said AC signal with a voltage reference to generate a clock signal; and
counting said waves of said AC signal by counting pulses of said clock signal.

14. The method of claim 12, wherein said adjusting of said driving signal comprises:
adjusting a dimming signal by counting said waves of said AC signal to adjust said driving signal.

15. The method of claim 14, wherein said adjusting of said driving signal comprises:
controlling said dimming signal from a first preset level to a second preset level when said number of said waves exceeds a predetermined number.

16. The method of claim 14, wherein said generating of said driving signal comprises:
enabling said counting of said waves to adjust said dimming signal to a level if a first pulse is generated based on said operations; and
disabling said counting of said waves to maintain said dimming signal at said level if a second pulse is generated based on said operations.

17. A system for powering a light-emitting diode (LED) light source, said system comprising:
conversion circuitry operable for receiving an alternating-current (AC) signal through a power switch and providing regulated power to said LED light source; and
dimming control circuitry coupled to said conversion circuitry and operable for generating a dimming signal according to a plurality of operations of said power switch, operable for counting waves of said AC signal, and operable for adjusting said dimming signal according to the number of said waves obtained by said counting, wherein dimming of said LED light source is controlled according to said dimming signal.

18. The system of claim 17, wherein said conversion circuitry comprises:
an alternating-current to direct-current (AC/DC) converter for converting AC power to DC power; and
a DC/DC converter coupled to said AC/DC converter and for converting said DC power to said regulated power by controlling a control switch in series with said LED light source according to said dimming signal.

19. The system of claim 17, wherein said dimming control circuitry compares a periodic signal indicative of said AC signal with a voltage reference to generate a clock signal and counts said waves of said AC signal by counting pulses of said clock signal.

20. The system of claim 17, wherein said dimming control circuitry controls said dimming signal from a first preset level to a second preset level when said number of said waves exceeds a predetermined number.

* * * * *